US011718376B1

(12) United States Patent
Armstrong

(10) Patent No.: US 11,718,376 B1
(45) Date of Patent: Aug. 8, 2023

(54) BROAD-BASED SHIP

(71) Applicant: Richard Lee Armstrong, West Palm Beach, FL (US)

(72) Inventor: Richard Lee Armstrong, West Palm Beach, FL (US)

(73) Assignee: S MART SOLUTIONS FOR AMERICA, West Palm Beach, FL (US)

( * ) Notice: Subject to any disclaimer, the term of this patent is extended or adjusted under 35 U.S.C. 154(b) by 0 days.

(21) Appl. No.: 17/177,158

(22) Filed: Feb. 16, 2021

Related U.S. Application Data

(60) Provisional application No. 62/974,659, filed on Dec. 16, 2019.

(51) Int. Cl.
*B63G 11/00* (2006.01)
*B64F 1/22* (2006.01)
*B63B 3/08* (2006.01)

(52) U.S. Cl.
CPC .............. *B63G 11/00* (2013.01); *B64F 1/222* (2013.01); *B63B 2003/085* (2013.01)

(58) Field of Classification Search
CPC ... B63B 35/50; B63B 2003/085; B64F 1/222; B64F 1/22; B63G 11/00
USPC ........................................................ 114/261
See application file for complete search history.

(56) References Cited

U.S. PATENT DOCUMENTS 6,279,500 B1 * 8/2001 Allen ........................ B64F 1/00
  114/259
8,276,535 B1 * 10/2012 Karem .................... B63B 35/50
  114/261

FOREIGN PATENT DOCUMENTS

| CN | 201777827 U | 3/2011 |
| CN | 203976170 U | 12/2014 |
| EP | 0739813 A1 | 10/1996 |
| GB | 200100251 | 2/2001 |
| JP | 2002037591 A | 2/2002 |

* cited by examiner

*Primary Examiner* — Daniel V Venne

(57) ABSTRACT

Disclosed herein is a broad-based ship that may be facilitated for landing and taking off of multiple aircraft, in accordance with some embodiments. Accordingly, the broad-based ship may include hulls, decks, and elevators. Further, the hulls may be configured to be floatably disposable in a water body. Further, the decks may be supported on the hulls. Further, the decks may include a flight deck and a lower deck. Further, the flight deck may include airstrips configured for allowing landing and taking off of aircraft on the airstrips simultaneously. Further, the elevators may be configured for transporting the aircraft between the lower deck and the flight deck simultaneously. Further, the transporting may include transferring the aircraft from the lower deck to the flight deck simultaneously. Further, the taking off of the aircraft simultaneously may be based on the transferring.

20 Claims, 45 Drawing Sheets

BROAD-BASED SHIP

The current application claims a priority to the U.S. provisional patent application Ser. No. 62/974,659 filed on Dec. 16, 2019. The U.S. provisional patent application 62/974,659 is revived within the two-month period for unintentional abandonment by Feb. 12, 2021.

The current application is a continuation-in-part (CIP) application of the U.S. non-provisional application Ser. No. 16/974,174 filed on Oct. 19, 2020.

The current application is also a CIP application of the U.S. design application serial number 29/765,210 filed on Jan. 6, 2021

FIELD OF THE INVENTION

Generally, the present disclosure relates to the field of ships. More specifically, the present disclosure relates to a broad-based ship that may be facilitated for landing and taking off of multiple aircraft.

BACKGROUND OF THE INVENTION

Existing aircraft carriers are deficient with regard to several aspects. For instance, existing aircraft carriers do not provide for simultaneous landing and taking off of multiple aircraft from the aircraft carriers. Furthermore, existing aircraft carriers do not board multiple aircraft. Moreover, existing aircraft carriers that are deployed in water are not sufficiently steady allowing comfortable landing and taking off of multiple aircraft from the aircraft carrier.

Therefore, there is a need for an improved aircraft carrier for facilitating landing and taking off of multiple aircraft that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a broad-based ship that may be facilitated for landing and taking off of multiple aircraft, in accordance with some embodiments. Accordingly, the broad-based ship may include one or more hulls, a plurality of decks, and a plurality of elevators. Further, the one or more hulls may be configured to be floatably disposable in at least one water body. Further, the plurality of decks may be supported on the one or more hulls. Further, the one or more hulls may be attached to a bottom surface of a deck of the plurality of decks. Further, the plurality of decks may be vertically spaced forming at least one interior space between the plurality of decks. Further, the plurality of decks may include a flight deck and at least one lower deck. Further, the at least one lower deck may be vertically disposed below the flight deck. Further, the at least one interior space may include at least one hangar space formed between the flight deck and the at least one lower deck. Further, the at least one hangar space may be configured for housing a plurality of aircraft. Further, the housing may include disposing the plurality of aircraft on the at least one lower deck. Further, the flight deck may include a plurality of airstrips disposed on an upper flight deck surface of the flight deck. Further, the plurality of airstrips may be configured for allowing at least one of landing and taking off of the plurality of aircraft on the plurality of airstrips simultaneously. Further, the plurality of elevators may be disposed in the at least one hangar space. Further, the plurality of elevators may be configured for transporting the plurality of aircraft between the at least one lower deck and the flight deck simultaneously. Further, the transporting may include transferring the plurality of aircraft from the at least one lower deck to the flight deck simultaneously. Further, the taking off of the plurality of aircraft simultaneously may be based on the transferring of the plurality of aircraft from the at least one lower deck to the flight deck. Further, the transporting may include transferring the plurality of aircraft from the flight deck to the at least one lower deck. Further, the housing of the plurality of aircraft may be based on the transferring of the plurality of aircraft from the flight deck to the at least one lower deck.

Further disclosed herein is a broad-based ship that may be facilitated for landing and taking off of multiple aircraft, in accordance with some embodiments. Accordingly, the broad-based ship may include one or more hulls, a plurality of decks, and a plurality of elevators. Further, the one or more hulls may be configured to be floatably disposable in at least one water body. Further, the plurality of decks may be supported on the one or more hulls. Further, the one or more hulls may be attached to a bottom surface of a deck of the plurality of decks. Further, the plurality of decks may be vertically spaced forming at least one interior space between the plurality of decks. Further, the plurality of decks may include a flight deck and at least one lower deck. Further, the at least one lower deck may be vertically disposed below the flight deck. Further, the at least one interior space may include at least one hangar space formed between the flight deck and the at least one lower deck. Further, the at least one hangar space may be configured for housing a plurality of aircraft. Further, the housing may include disposing the plurality of aircraft on the at least one lower deck. Further, the flight deck may include a plurality of airstrips disposed on an upper flight deck surface of the flight deck. Further, the plurality of airstrips may be configured for allowing at least one of landing and taking off of the plurality of aircraft on the plurality of airstrips simultaneously. Further, the plurality of airstrips may include at least 24 airstrips. Further, the at least 24 airstrips allows the at least one of the landing and the taking off of at least 24 aircraft from the at least 24 airstrips simultaneously. Further, the plurality of elevators may be disposed in the at least one hangar space. Further, the plurality of elevators may be configured for transporting the plurality of aircraft between the at least one lower deck and the flight deck simultaneously. Further, the transporting may include transferring the plurality of aircraft from the at least one lower deck to the flight deck simultaneously. Further, the taking off of the plurality of aircraft simultaneously may be based on the transferring of the plurality of aircraft from the at least one lower deck to the flight deck. Further, the transporting may include transferring the plurality of aircraft from the flight deck to the at least one lower deck. Further, the housing of the plurality of aircraft may be based on the transferring of the plurality of aircraft from the flight deck to the at least one lower deck.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
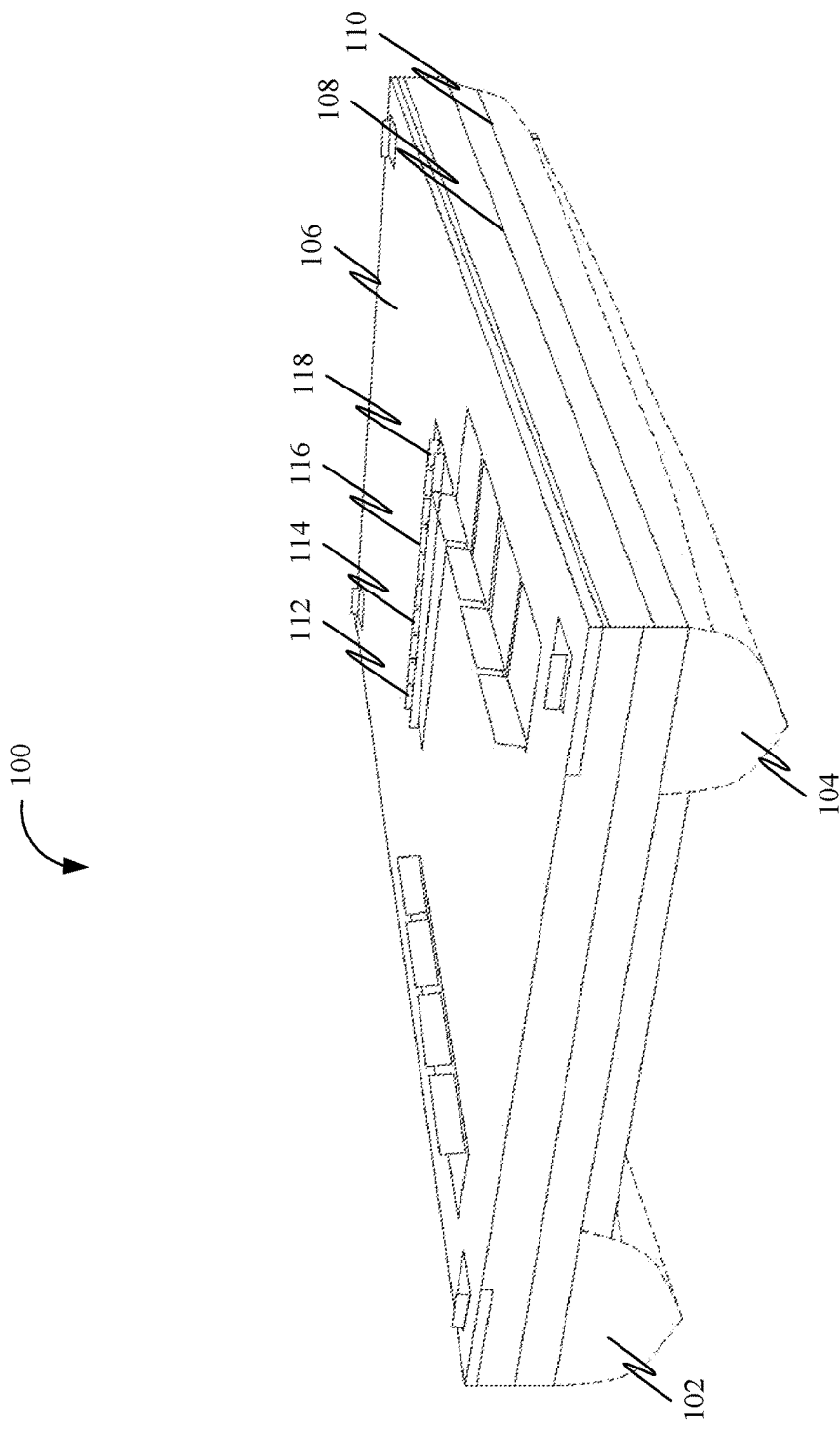
FIG. 1 is a perspective view of a broad-based ship that may be facilitated for landing and taking off of multiple aircraft, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a broad-based ship that may be facilitated for landing and taking off of multiple aircraft, embodiments of the present disclosure are not limited to use only in this context.

Overview

The present disclosure describes a broad-based ship that may be facilitated for landing and taking off of multiple aircraft. Thus, the board-based water-faring vessel can be, but is not limited to, a boat, a yacht, a passenger ship, a warship, a cruise liner, an oil tanker, a cargo ship, or any other kind of water-faring vessel. Further, the broad-based ship may include a vessel. Further, the vessel may include an improved shape. Further, the present disclosure describes an ocean-going vessel. Further, the ocean-going vessel may include two or three hulls or more with a large flat top platform on a top side of the two or three hulls. Moreover, the hulls of the ocean-going vessel raises the large flat top platform of the ocean-going vessel far enough above the surface of the water so that smaller ships, submarines, and other water-faring vessel are able to easily travel underneath the ocean-going vessel.

Further, the present disclosure describes the broad-based ships that may allow simultaneous landing and take-off of multiple aircraft from a steady platform disposed on the top side of the two or three hulls. Further, the broad-based ship can also allow a large aircraft to land and take off because of the size of the platform. A larger platform also creates a steady vessel, creates a steady motion for jets and other aircraft to land and take off which helps in the safety of the pilots. The broad-based ship allows as many aircraft on board. Further, an improved design of a vessel (broad-based ship) improves the number of aircraft onboard and the amount that can take off and land at one time that also includes the larger size aircraft. Further, the broad-based ship may include rows of aircraft lined up to fuel and reload weapons to prepare them for fast and ready take off. Each aircraft after it's fueled and loaded with weapons/cargo with goes up the elevators many at one time and coming up on the top deck and ready for take-off. Further, the turbulence in a vessel at sea is known with high seas and that turbulence moves the main deck of the vessel in all directions making it hard for pilots to land and take off from the main deck in high seas as the turbulence may create a displacement of the aircraft when landing and taking off. Further, a wide and long top platform of the vessel creates a safer area for the aircraft to land and take-off during turbulence. Furthermore, the design of the vessel may include a large platform and hulls attached to the large platform for creating more room on the watercraft (broad-based ship) and less of the vessel in the water which also creates a faster vessel because of less water going against the hulls.

Further, the present disclosure describes a vessel with a large platform on top of hulls to increase payload for allowing aircraft for landing and taking off from the large platform. Further, many aircraft can take off and land on the large platform, and with the aircraft in the hanger of the vessel getting ready with fuel and payload to be ready for takeoff on a flight deck of the vessel. This vessel design increases the amount of jets or aircraft that can take off and land at one time. Further, the platform adjoined to the hulls. Further, the vessel allows multiple aircraft to come up at the same time from hanger loaded, fueled, and ready to go. Further, multiple aircraft may take-off from the large platform at the same time. Further, the large platform may provide a large flat area for multiple aircraft to take off and land. Further, the hangar may include a large area under the flight deck for allowing multiple aircraft to refuel and load payload on the multiple aircraft. Further, the flight deck may include a large area for allowing multiple aircraft to take off and land same time in a safer way, without any need for a landing cable for landing or a pulley for take-off. Further, the flight deck may use a pulley for take-off and a cable for landing, for a smaller vessel. Further, the hulls present in the vessel may not be limited to only 2 hulls. Further, the vessel may use more than 2 hulls. Further, multiple hulls mean 2 or more hulls. Further, the hulls may include only one hull. Further, the vessel may use only one hull. Further, the flight deck is a large flight deck. Further, the platform creates more room for more aircraft. Further, the flight deck does not use pulley for take-off and cable for landing, for a large vessel. Further, the vessel may include a watercraft for multiple aircraft landing and taking off.

Further, the present disclosure describes a system design for enhancing aircraft takeoff and landing from a platform of a vessel. Further, the present disclosure also describes the amount of aircraft on the platform of the vessel.

Further, the present disclosure describes a method of having more aircraft fueling, loading payloads, and take-off and landing more often.

Further, the present disclosure describes a vessel (broad-based ship) that is configured for allowing more jets to take-off per minute. Further, the vessel may also be used to load cargo. Further, the vessel may also be used as a passenger ship for transporting passengers.

Further, the present disclosure describes a broad-based ship comprising a hanger area in the lower deck to house a plurality of jets and multiple elevators to transport the plurality of jets from the hanger area onto the flight deck for the simultaneous take-off of jets (e.g. as many as 24 jets).

FIG. 1 is a perspective view of a broad-based ship 100 that may be facilitated for landing and taking off of multiple aircraft, in accordance with some embodiments. Further, the broad-based ship 100 may include one or more hulls 102-104, a plurality of decks 106-110, and a plurality of elevators 112-118.

Further, the one or more hulls 102-104 may be configured to be floatably disposable in at least one water body. Further, the at least one water body may include a lake, a sea, a river, an ocean, etc.

Further, the plurality of decks 106-110 may be supported on the one or more hulls 102-104. Further, the one or more hulls 102-104 may be attached to a bottom surface of a deck of the plurality of decks 106-110. Further, the plurality of decks 106-110 may be vertically spaced forming at least one interior space between the plurality of decks 106-110. Further, the plurality of decks 106-110 may include a flight deck 106 and at least one lower deck. Further, the at least one lower deck may include a hangar deck 108 and an accommodation deck 110. Further, the at least one lower deck may be vertically disposed below the flight deck 106. Further, the at least one interior space may include at least one hangar space formed between the flight deck 106 and the at least one lower deck. Further, the at least one hangar space may be configured for housing a plurality of aircraft. Further, the housing may include disposing the plurality of aircraft on the at least one lower deck. Further, the flight deck 106 may include a plurality of airstrips disposed on an upper flight deck surface of the flight deck 106. Further, the plurality of airstrips may be configured for allowing at least one of landing and taking off of the plurality of aircraft on the plurality of airstrips simultaneously.

Further, the plurality of elevators 112-118 may be disposed in the at least one hangar space. Further, the plurality of elevators 112-118 may be configured for transporting the plurality of aircraft between the at least one lower deck and the flight deck 106 simultaneously. Further, the transporting may include transferring the plurality of aircraft from the at least one lower deck to the flight deck 106 simultaneously. Further, the taking off of the plurality of aircraft simultaneously may be based on the transferring of the plurality of aircraft from the at least one lower deck to the flight deck 106. Further, the transporting may include transferring the plurality of aircraft from the flight deck 106 to the at least one lower deck. Further, the housing of the plurality of aircraft may be based on the transferring of the plurality of aircraft from the flight deck 106 to the at least one lower deck.

Further, in some embodiments, the one or more hulls 102-104 may be arranged in at least one hull configuration on the bottom surface of the deck for steadily disposing the broad-based ship 100 on the at least one water body. Further, the at least one hull configuration may include at least one arrangement of the one or more hulls 102-104 on the bottom surface of the deck. Further, the at least one of the landing and the taking off the plurality of aircraft from the plurality of airstrips simultaneously may be based on the steadily disposing of the broad-based ship 100. Further, in an embodiment, a hull configuration of the at least one hull configuration of the one or more hulls 102-104 on the bottom surface of the deck corresponds to a payload capacity of the broad-based ship 100. Further, the at least one of the landing and the taking off of the plurality of aircraft simultaneously may be based on the payload capacity. Further, in an embodiment, a hull configuration of the at least one hull configuration of the one or more hulls 102-104 on the bottom surface of the deck corresponds to a submerged volume of the one or more hulls 102-104 in the water of the at least one water body. Further, a propelling speed of the broad-based ship 100 may be based on the submerged volume of the one or more hulls 102-104.

Further, in some embodiments, the one or more hulls 102-104 may include a first hull and a second hull. Further, the first hull may be attached to a first peripheral side of the bottom surface of the deck. Further, the second hull may be attached to a second peripheral side of the bottom surface of the deck. Further, the first peripheral side of the bottom surface opposes the second peripheral side of the bottom surface.

Further, in some embodiments, the flight deck 106 may include a flight deck length and a flight deck breadth defining the upper flight deck surface. Further, the at least one of the landing and the taking off of the plurality of aircraft may be based on the flight deck length and the flight deck breadth. Further, in an embodiment, the flight deck length may be at least 10580 feet and the flight deck breadth may be at least 5288 feet. Further, in an embodiment, at least one of the landing of the plurality of aircraft on the plurality of airstrips does not require a plurality of landing cables and the taking of the plurality of aircraft from the plurality of airstrips does not require a plurality of pulley assemblies based on the flight deck length and flight deck breadth. Moreover, in other embodiments, the flight deck length and the flight deck breadth is sized any set of dimensions that allows for the efficient and effective movement and/or arrangement of aircrafts across the flight deck 106 for any specified purpose. Moreover, in some embodiments, the flight deck length and the flight deck breadth is sized to be the size of a typical airport.

Further, in some embodiments, the plurality of airstrips may include at least 24 airstrips. Further, the at least 24 airstrips allows the at least one of the landing and the taking off of at least 24 aircraft from the at least 24 airstrips simultaneously.

Further, in some embodiments, the transporting of the plurality of aircraft between the at least one lower deck and the flight deck 106 may be independently and simultaneously.

Further, in some embodiments, the transporting of the plurality of aircraft between the at least one lower deck and the flight deck 106 may be dependently and simultaneously.

Figure 2:
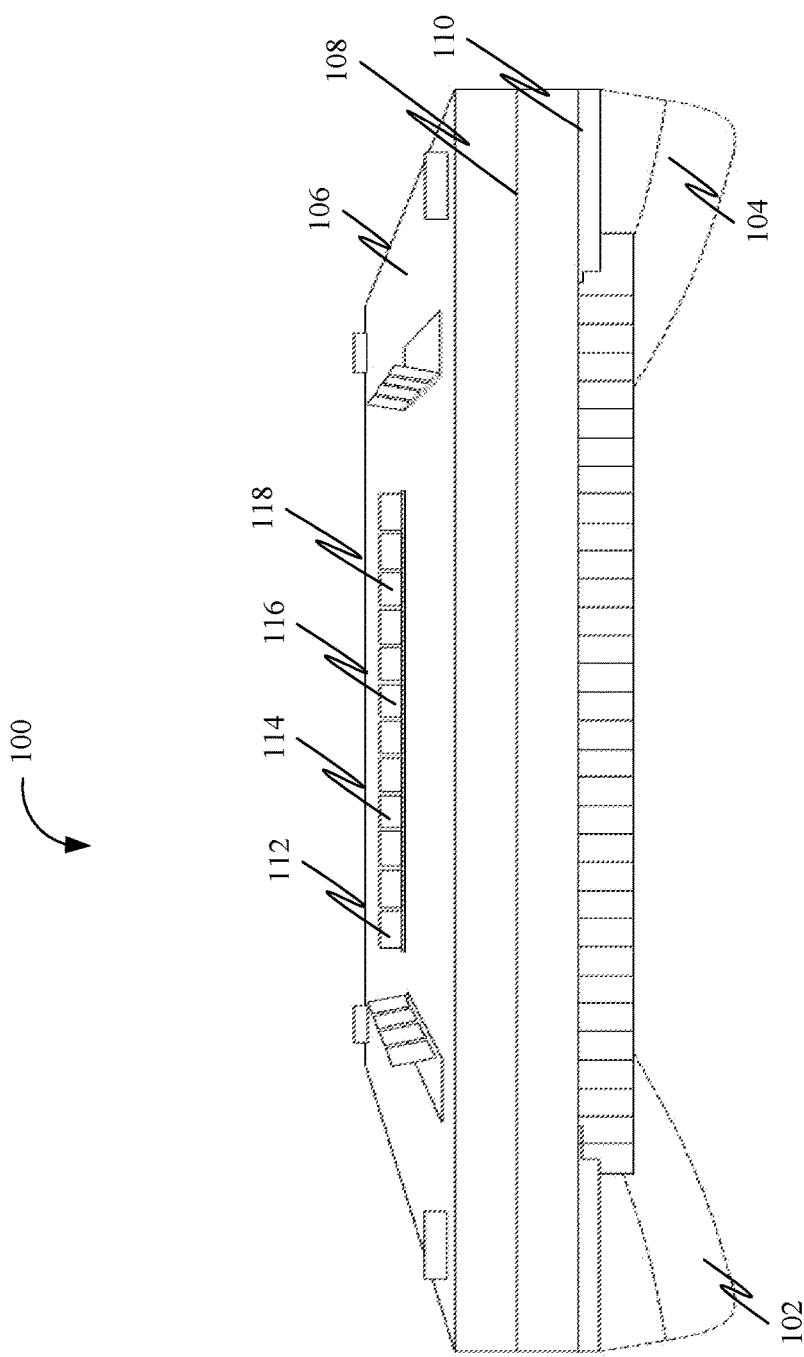
FIG. 2 is a front view of the broad-based ship, in accordance with some embodiments.

FIG. 2 is a front view of the broad-based ship 100, in accordance with some embodiments.

Figure 3:
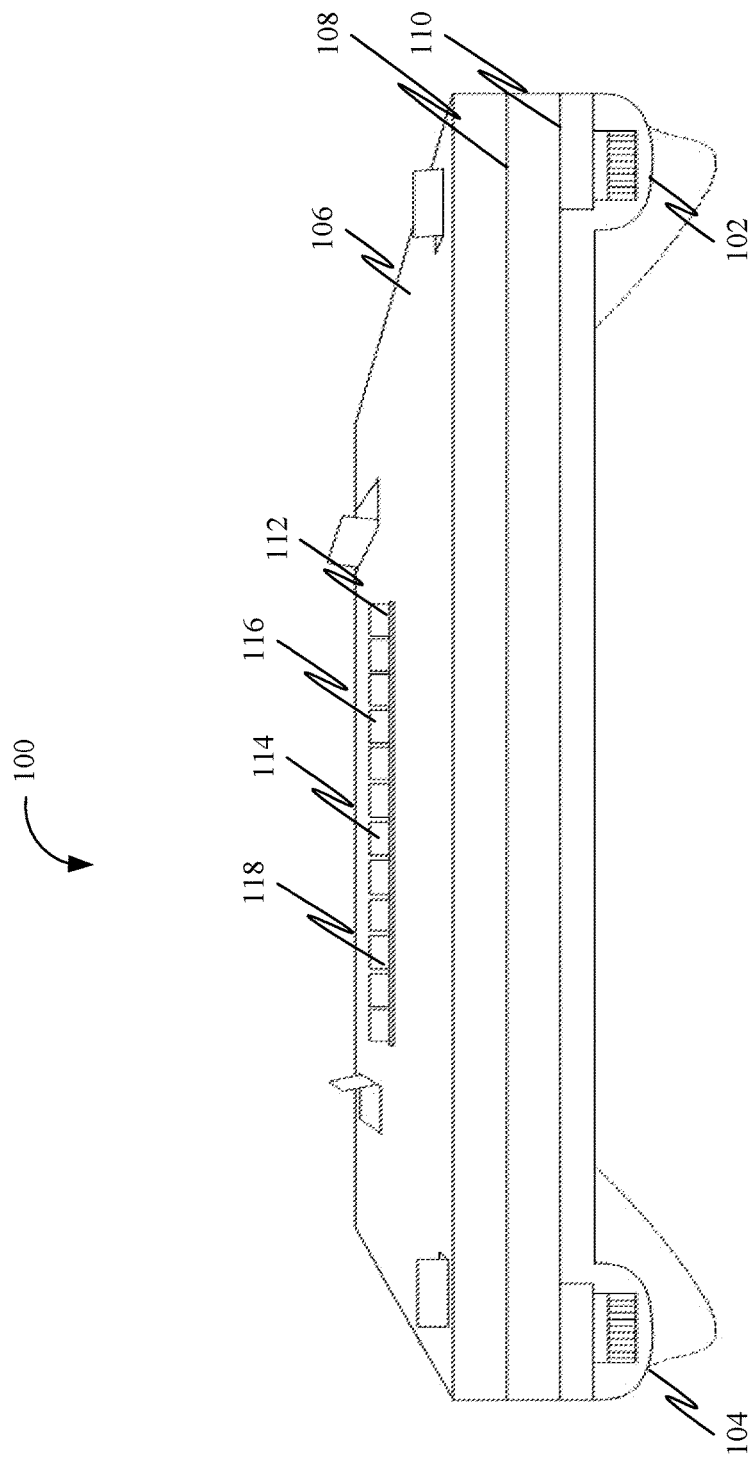
FIG. 3 is a rear view of the broad-based ship, in accordance with some embodiments.

FIG. 3 is a rear view of the broad-based ship 100, in accordance with some embodiments.

Figure 4:
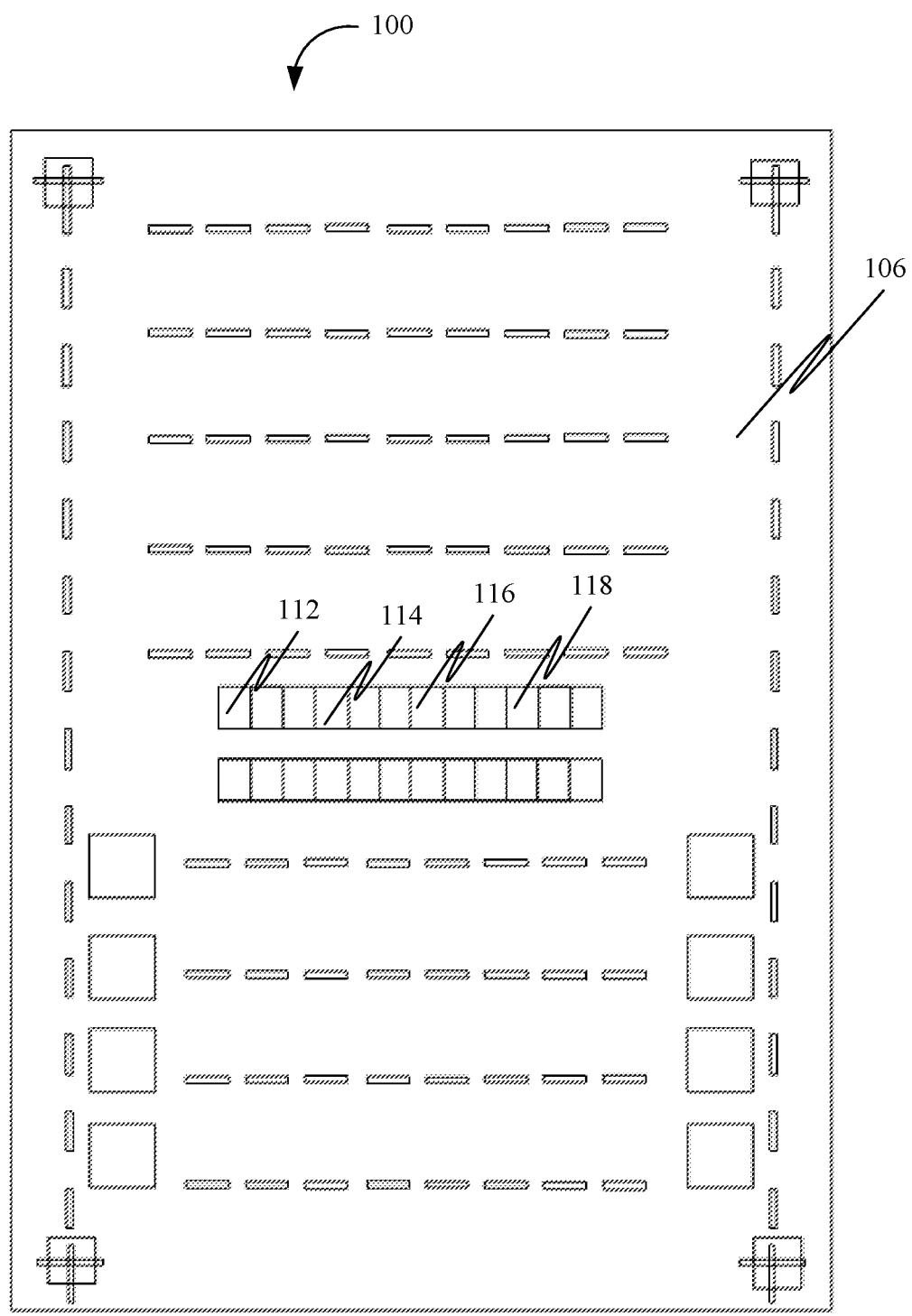
FIG. 4 is a top view of the broad-based ship, in accordance with some embodiments.

FIG. 4 is a top view of the broad-based ship 100, in accordance with some embodiments.

Figure 5:
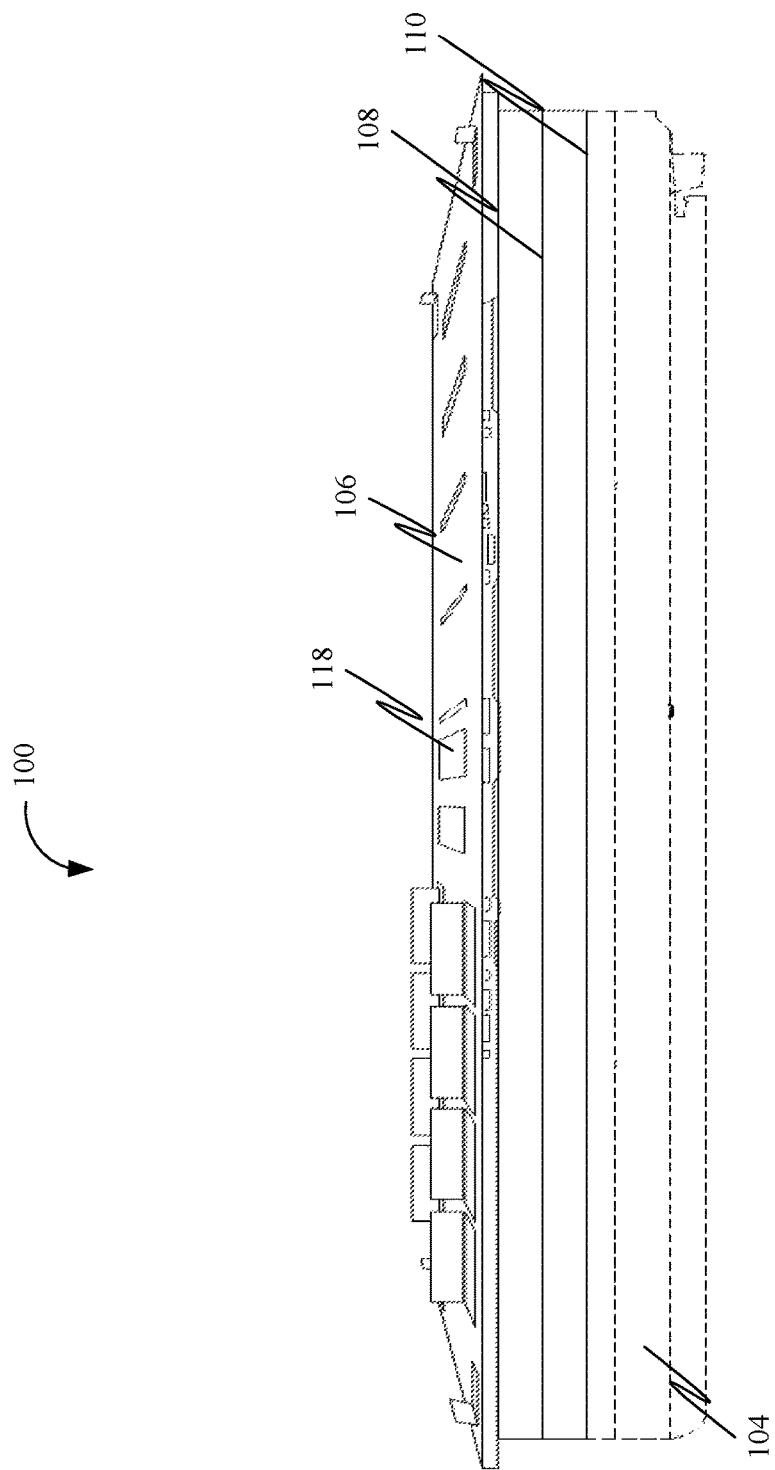
FIG. 5 is a side view of the broad-based ship, in accordance with some embodiments.

FIG. 5 is a side view of the broad-based ship 100, in accordance with some embodiments.

Figure 6:
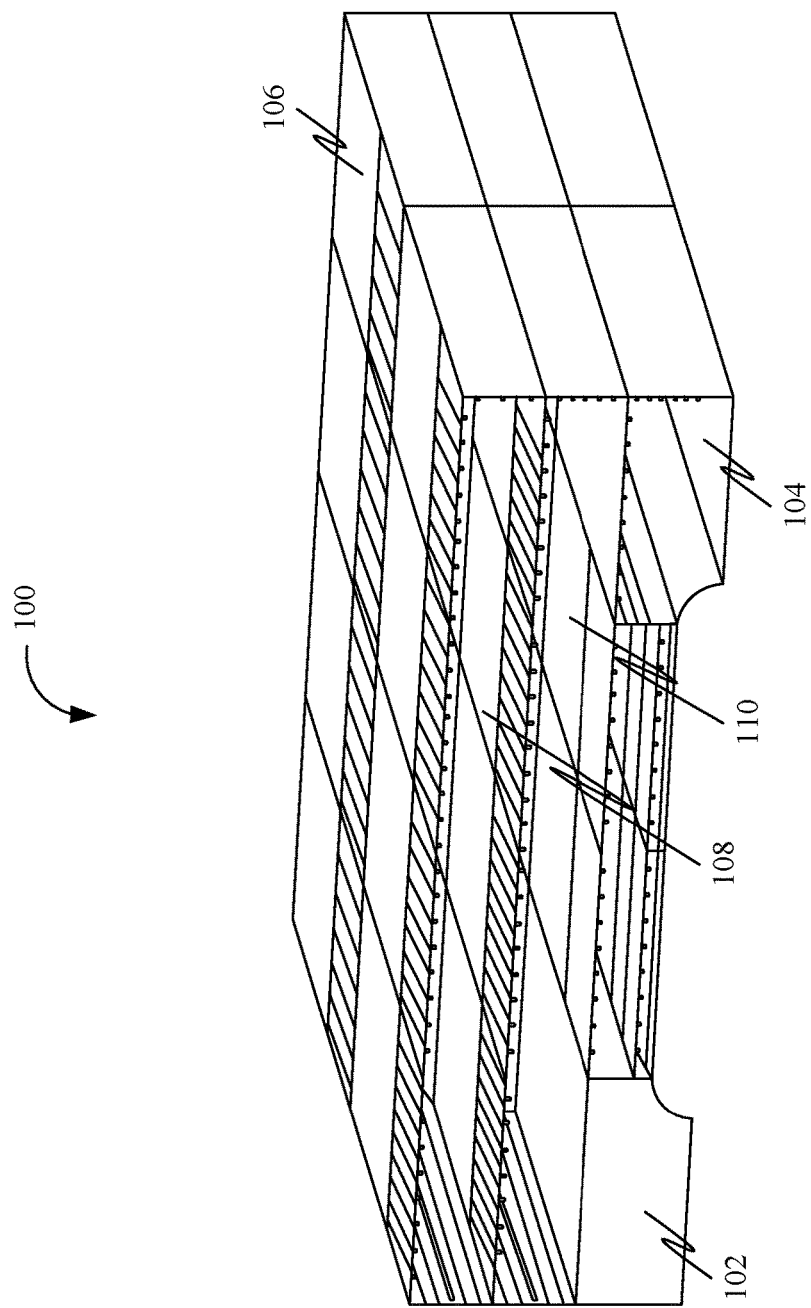
FIG. 6 is a cross-sectional perspective view of the broad-based ship, in accordance with some embodiments.

FIG. 6 is a cross-sectional perspective view of the broad-based ship 100, in accordance with some embodiments.

Figure 7:
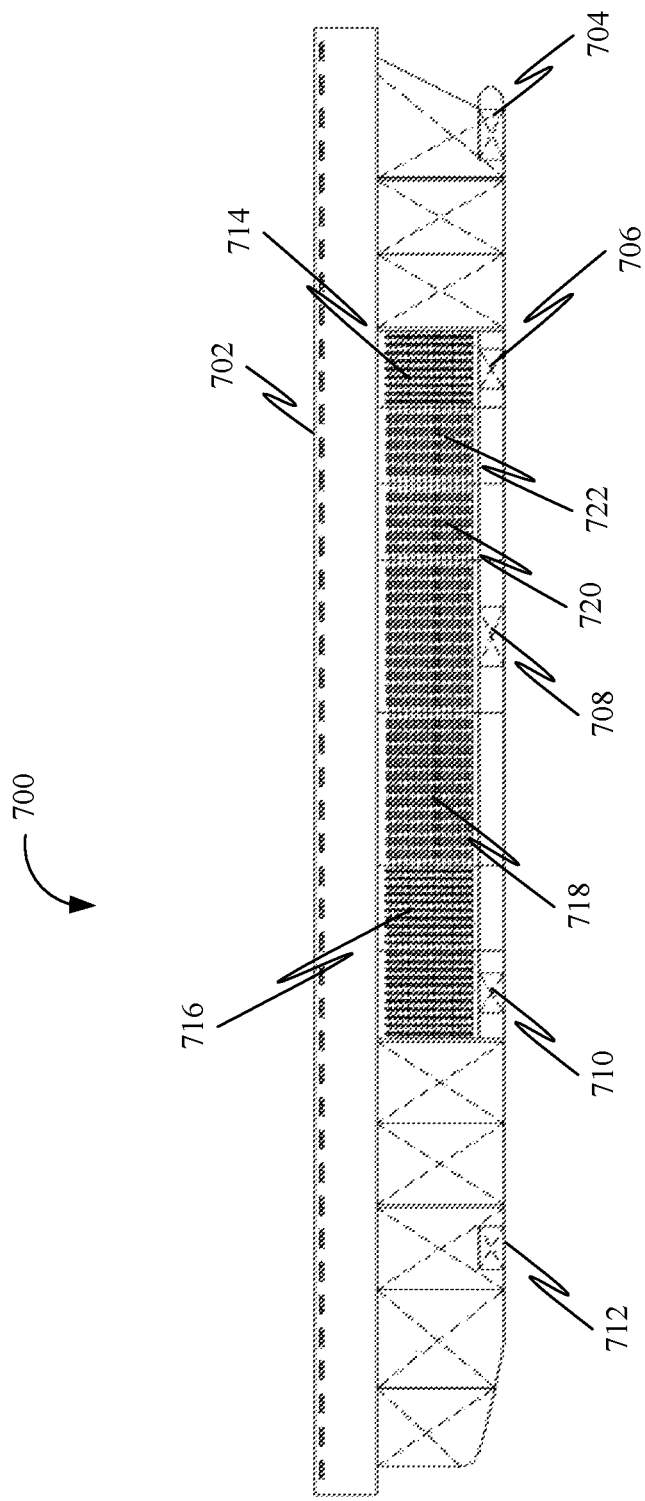
FIG. 7 is a side view of a broad-based ship that may be facilitated for landing and taking off of multiple aircraft, in accordance with some embodiments.

FIG. 7 is a side view of a broad-based ship 700 that may be facilitated for landing and taking off of multiple aircraft, in accordance with some embodiments. Further, the broad-based ship 700 may include a plurality of decks. Further, the plurality of decks may include a flight deck 702. Further, the broad-based ship 700 may include one or more torpedo rooms 704-712, one or more bomb Stor-It 714-716, one or more jet Stor-It 718, one or more helicopter Stor-It 720, and one or more drone Stor-It 722.

Figure 8:
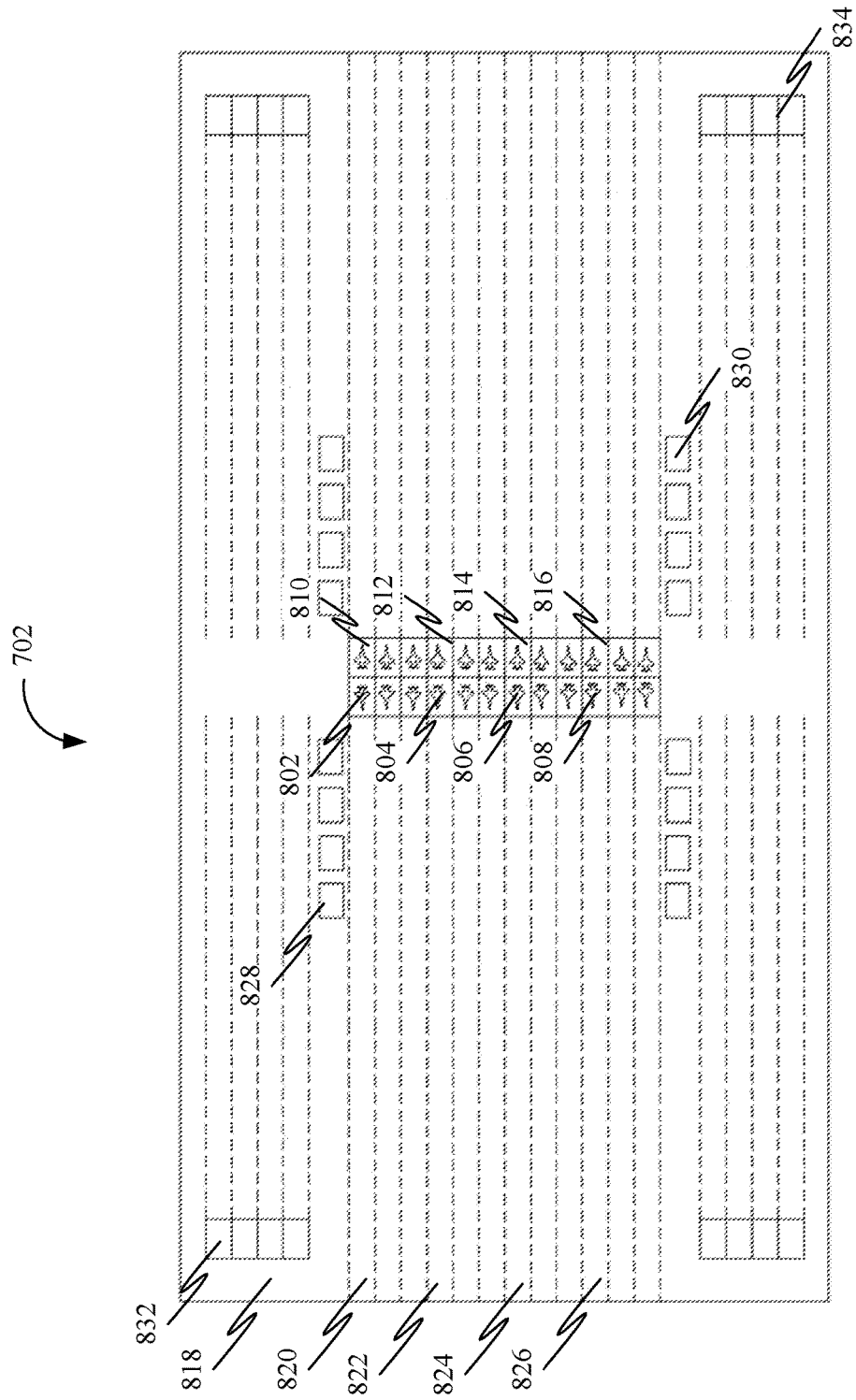
FIG. 8 is a top view of the flight deck of the plurality of decks of the broad-based ship, in accordance with some embodiments.

FIG. 8 is a top view of the flight deck 702 of the plurality of decks of the broad-based ship 700, in accordance with some embodiments. Further, the flight deck 702 may include a plurality of airstrips 820-826 disposed on an upper flight deck surface 818 of the flight deck 702. Further, the plurality of airstrips 820-826 may be configured for allowing at least one of landing and taking off of a plurality of aircraft 802-808 on the plurality of airstrips 820-826 simultaneously. Further, the plurality of aircraft 802-808 may include a plurality of jets, a plurality of helicopters, a plurality of drones, etc. Further, the broad-based ship 700 may include a plurality of flight deck center jet elevators 810-816. Further, the broad-based ship 700 may include a plurality of flight deck drone elevators 828-830. Further, the broad-based ship 700 may include a plurality of flight deck side jet elevators 832-834.

Figure 9:
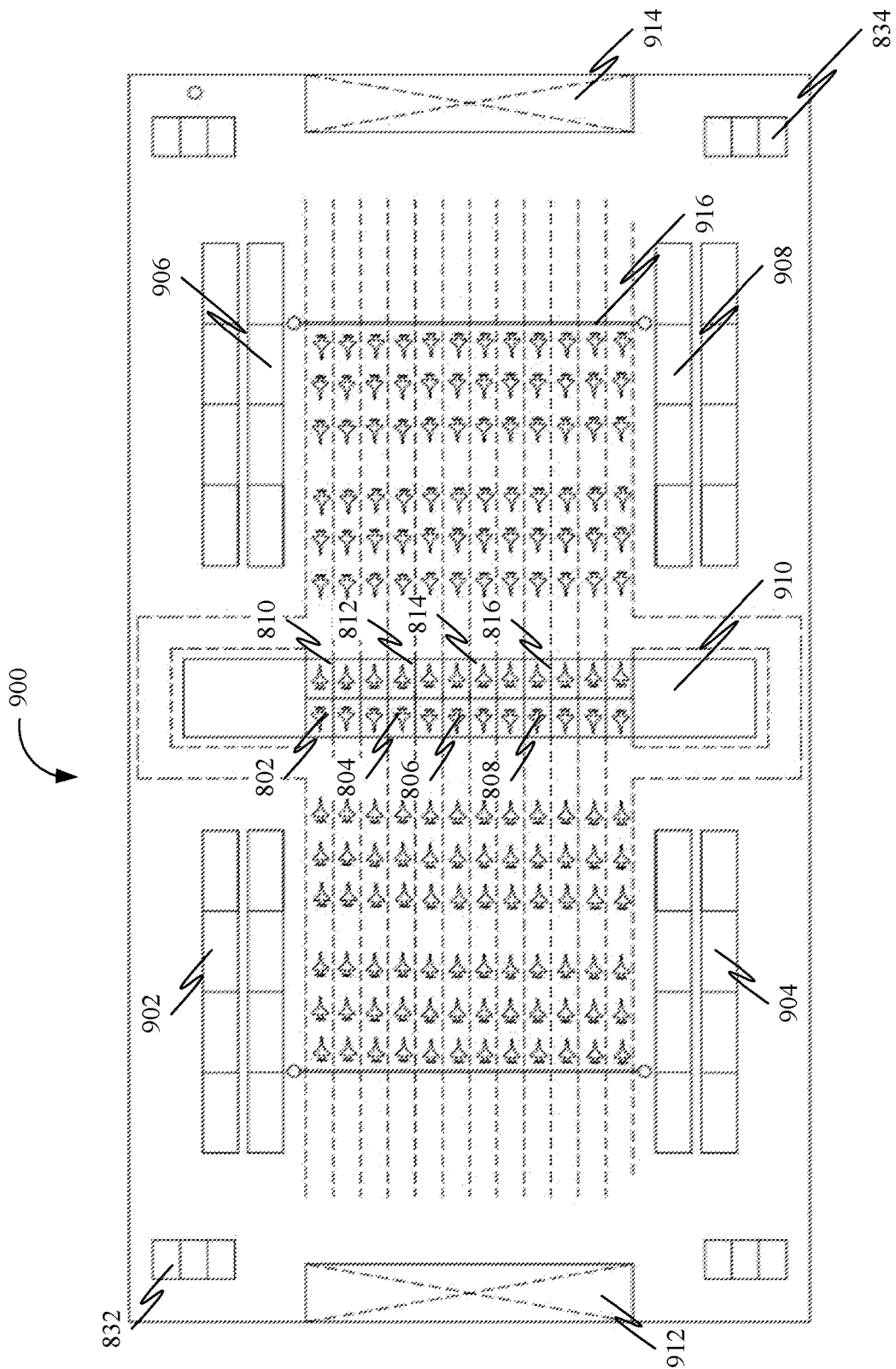
FIG. 9 is a top view of a hangar deck of the plurality of decks of the broad-based ship, in accordance with some embodiments.

FIG. 9 is a top view of a hangar deck 900 of the plurality of decks of the broad-based ship 700, in accordance with some embodiments. Further, the broad-based ship 700 may include one or more drone elevators 902-904 disposed on the hangar deck 900. Further, the broad-based ship 700 may include one or more bomb elevators 906-908 disposed on the hangar deck 900. Further, the broad-based ship 700 may include a jet hanger large elevator 910 disposed on the hangar deck 900. Further, the broad-based ship 700 may include one or more jet fuel stations 912-914 disposed on the hangar deck 900. Further, the broad-based ship 700 may include a jet fuel line 916 disposed on the hangar deck 900. Further, the broad-based ship 700 may include a jet hanger large elevator 910.

Figure 10:
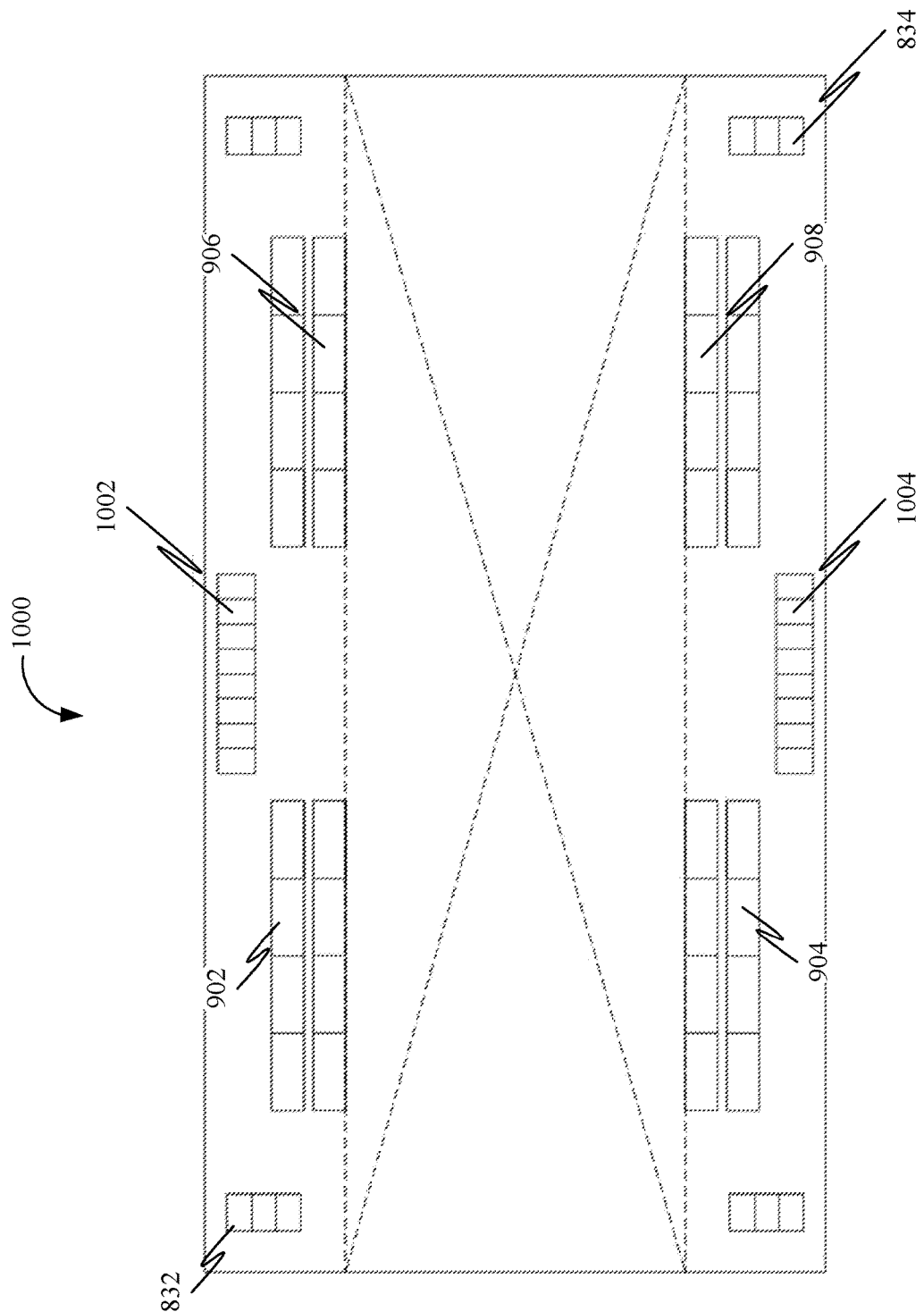
FIG. 10 is a top view of an open area of the broad-based ship, in accordance with some embodiments.

FIG. 10 is a top view of an open area 1000 of the broad-based ship 700, in accordance with some embodiments. Further, the broad-based ship 700 may include one or more jet elevator hull jet Stor-It 1002-1004 disposed on the open area 1000.

Figure 11:
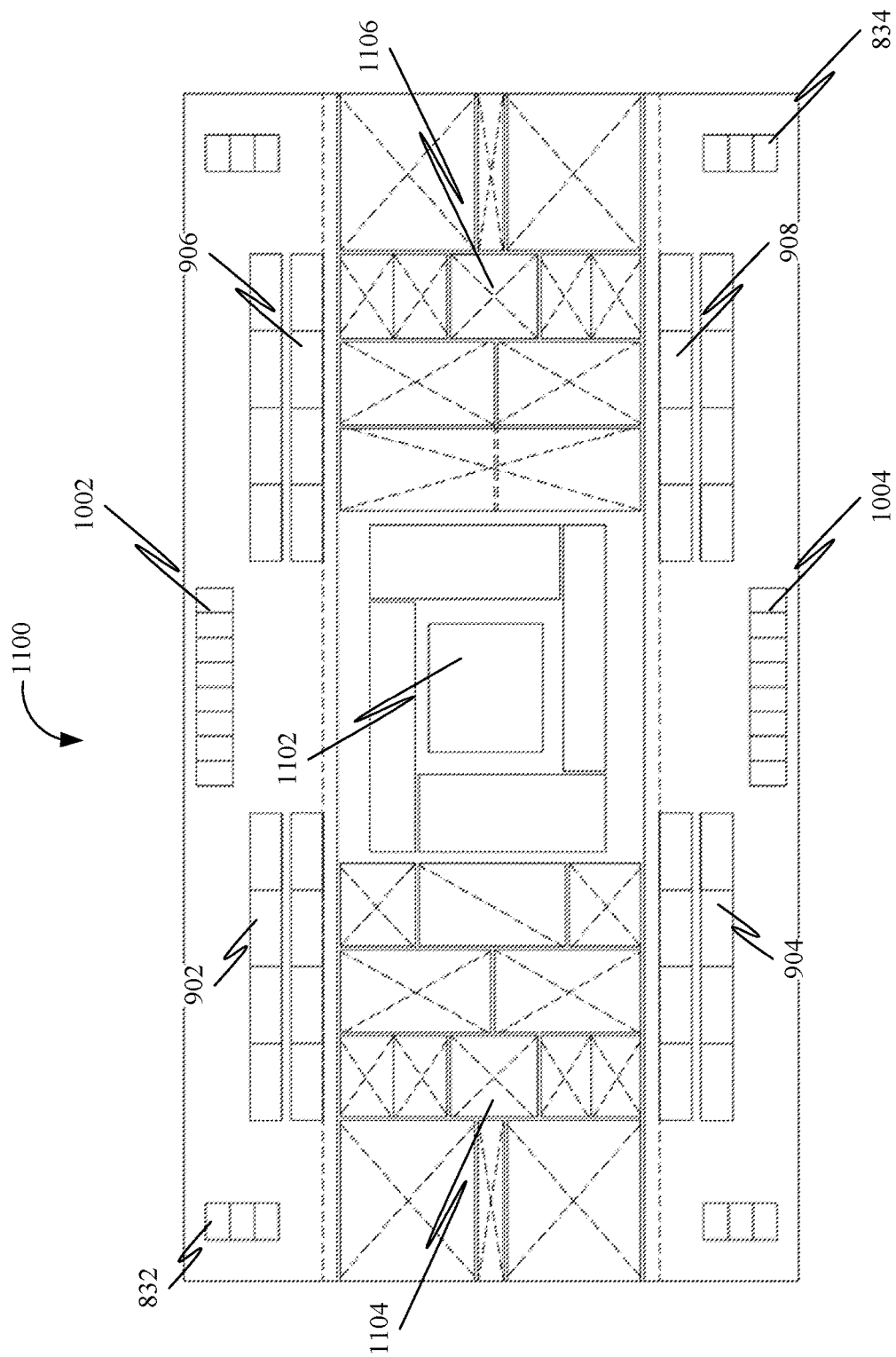
FIG. 11 is a top view of an accommodation deck of the plurality of decks of the broad-based ship, in accordance with some embodiments.

FIG. 11 is a top view of an accommodation deck 1100 of the plurality of decks of the broad-based ship 700, in accordance with some embodiments. Further, the broad-based ship 700 may include one or more malls and restaurants 1102 disposed on the accommodation deck 1100. Further, the broad-based ship 700 may include one or more accommodation areas 1104-1106 disposed on the accommodation deck 1100.

Figure 12:
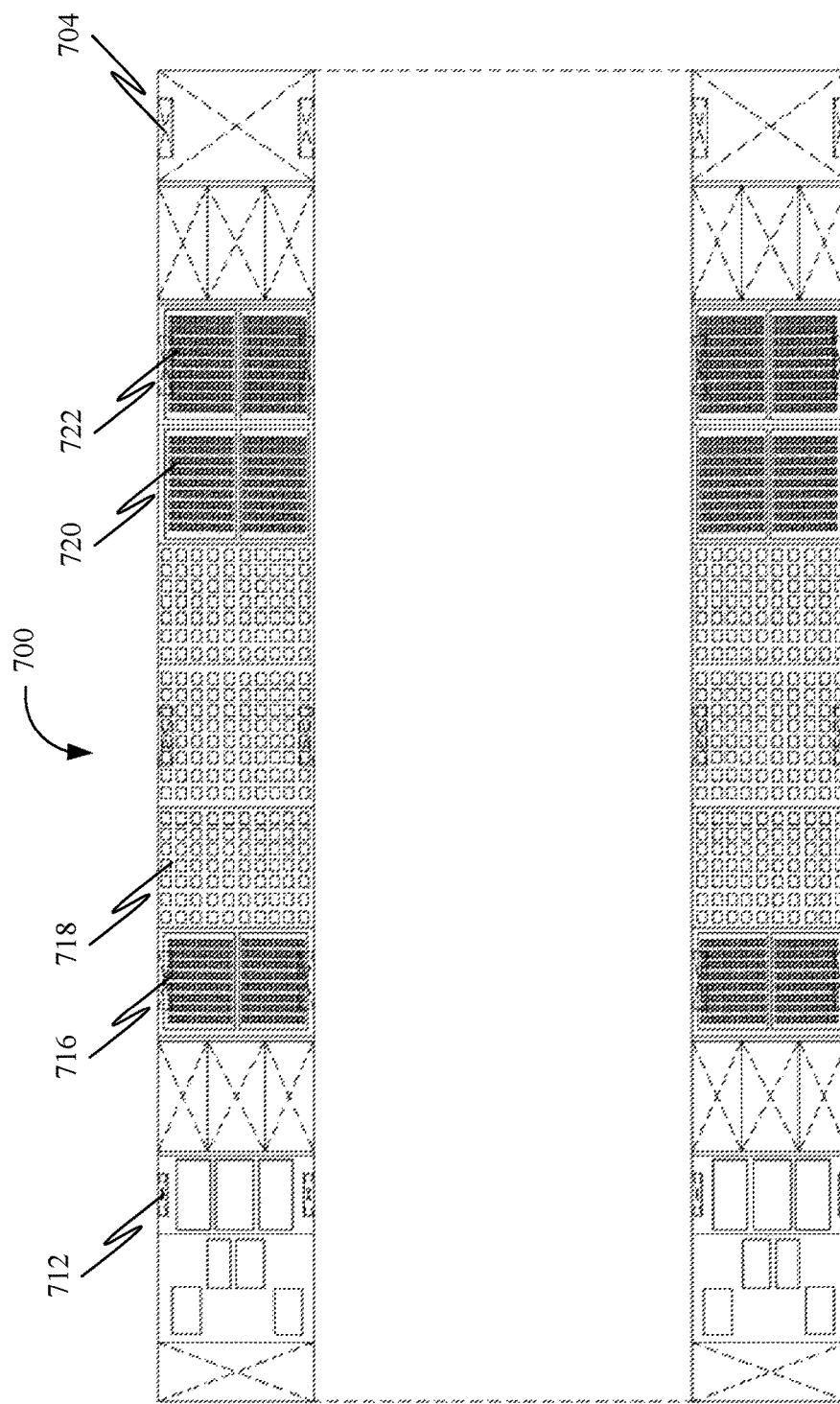
FIG. 12 is a partial view of the broad-based ship without the plurality of decks, in accordance with some embodiments.

FIG. 12 is a partial view of the broad-based ship 700 without the plurality of decks, in accordance with some embodiments.

Figure 13:
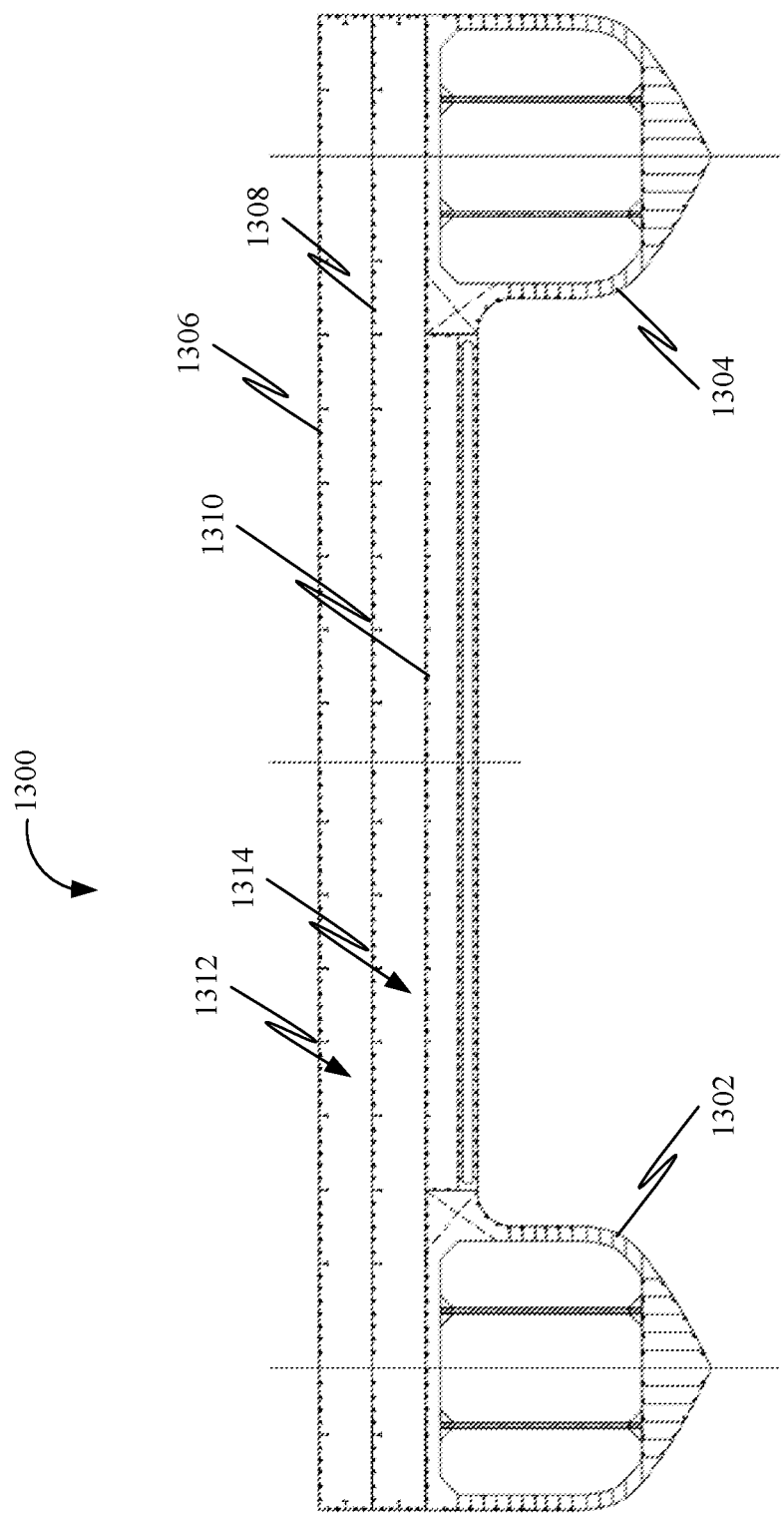
FIG. 13 is a cross-sectional view of a broad-based ship that may be facilitated for landing and taking off of multiple aircraft, in accordance with some embodiments.

FIG. 13 is a cross-sectional view of a broad-based ship 1300 that may be facilitated for landing and taking off of multiple aircraft, in accordance with some embodiments. Further, the broad-based ship 1300 may include one or more hulls 1302-1304 and a plurality of decks 1306-1310. Further, the plurality of decks 1306-1310 may be supported on the one or more hulls 1302-1304. Further, the plurality of decks 1306-1310 may be vertically spaced forming at least one interior space 1312-1314 between the plurality of decks 1306-1310.

Figure 14:
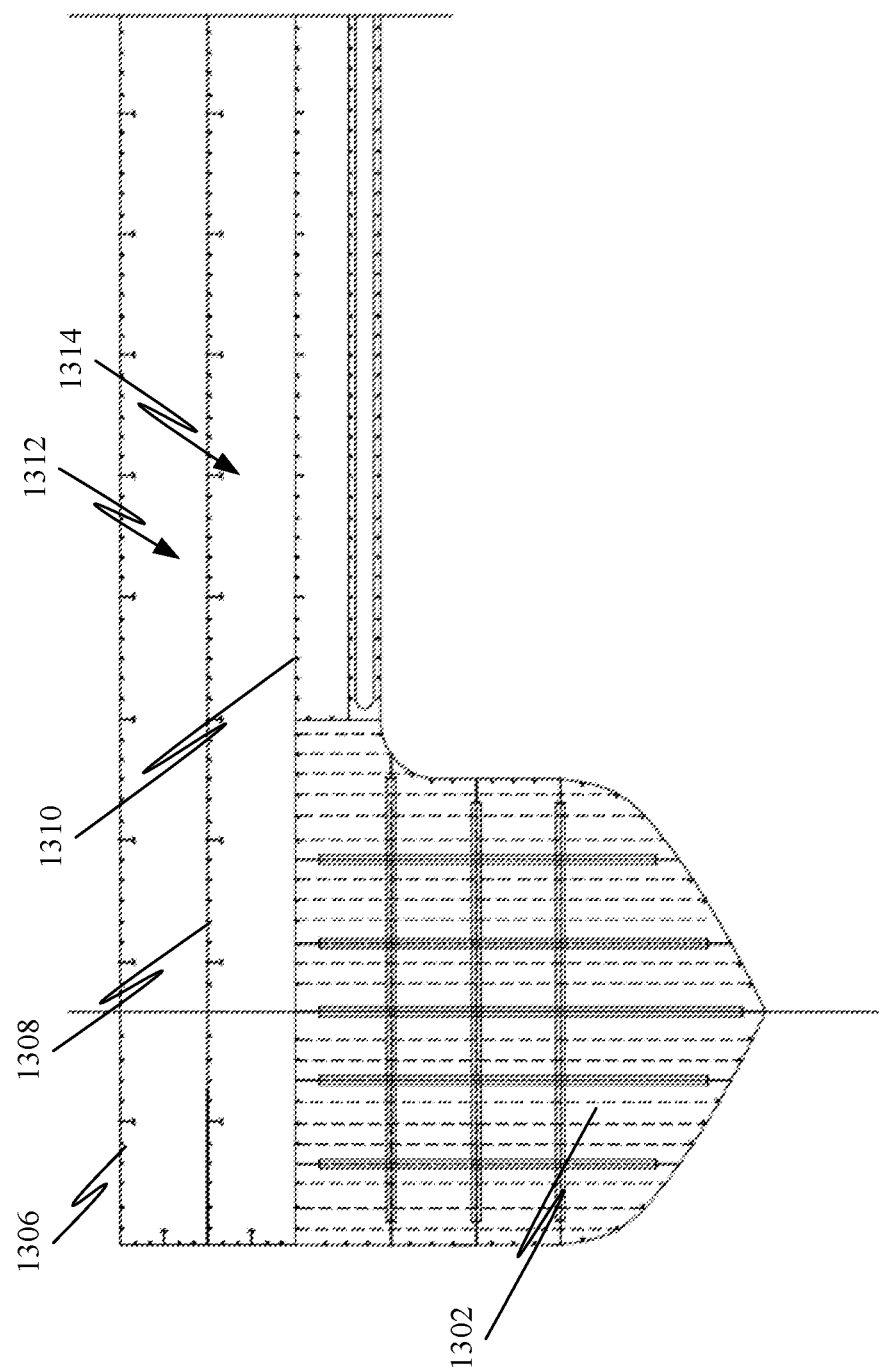
FIG. 14 is a front view of a hull of the broad-based ship, in accordance with some embodiments.

FIG. 14 is a front view of a hull 1302 of the broad-based ship 1300, in accordance with some embodiments.

Figure 15:
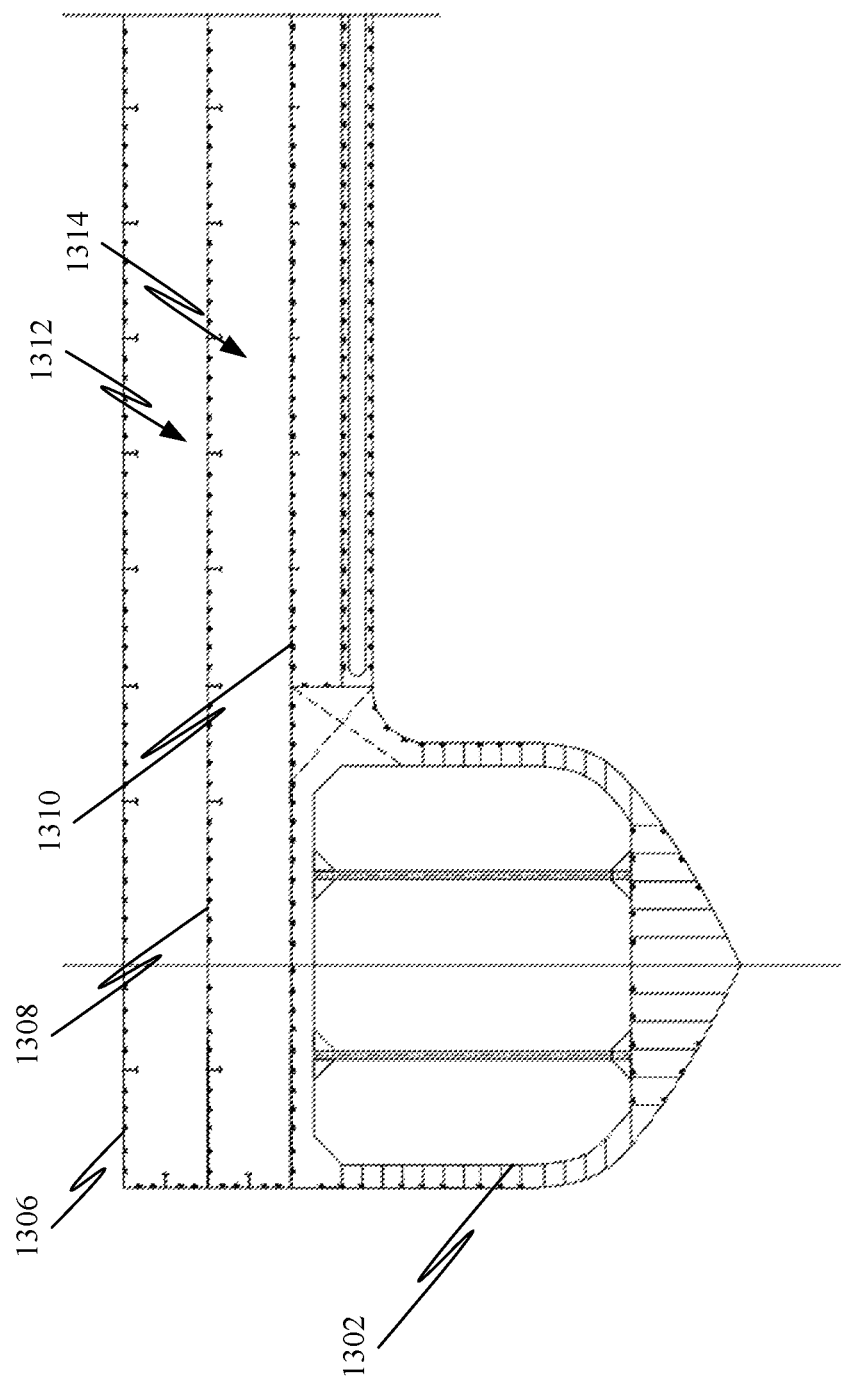
FIG. 15 is a cross-sectional view of the hull of the broad-based ship, in accordance with some embodiments.

FIG. 15 is a cross-sectional view of the hull 1302 of the broad-based ship 1300, in accordance with some embodiments.

Figure 16:
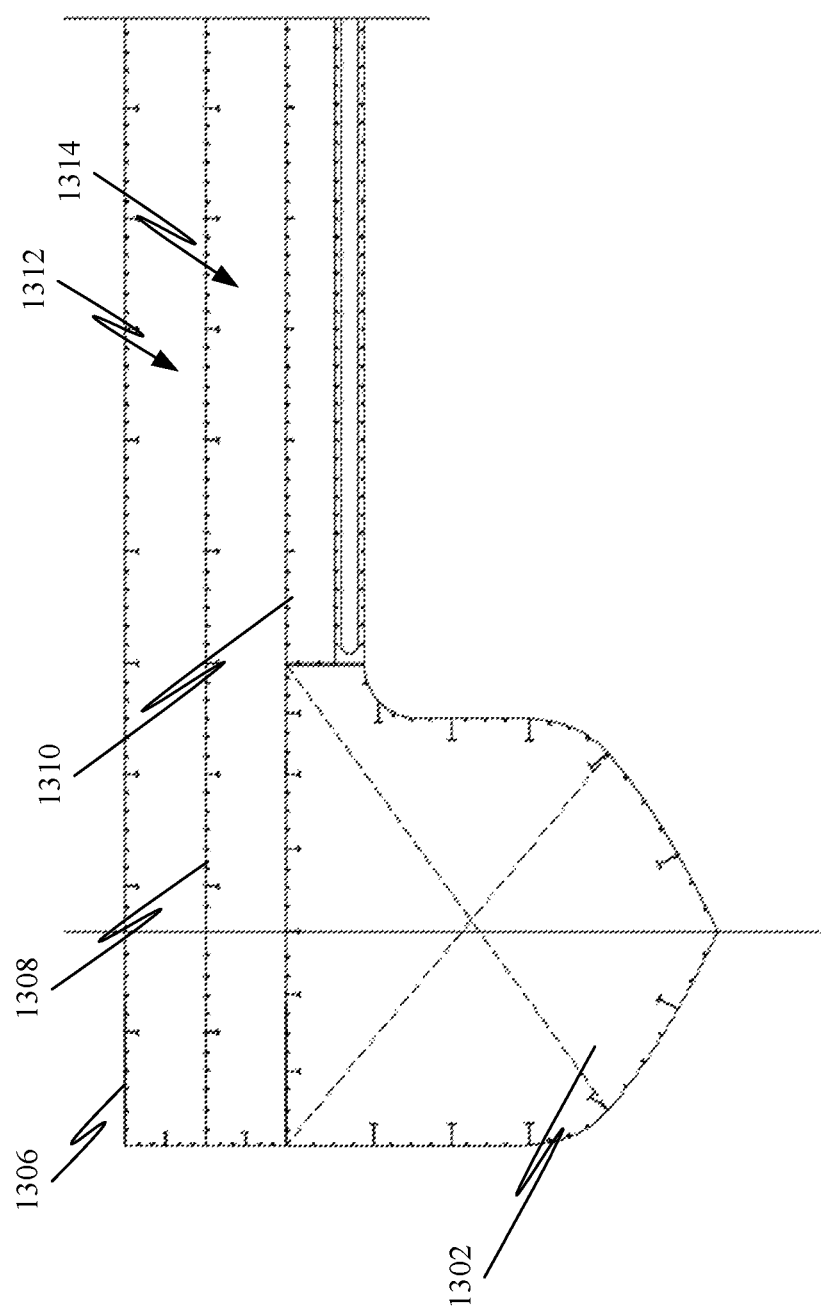
FIG. 16 is a rear view of the hull of the broad-based ship, in accordance with some embodiments.

FIG. 16 is a rear view of the hull 1302 of the broad-based ship 1300, in accordance with some embodiments.

Figure 17:
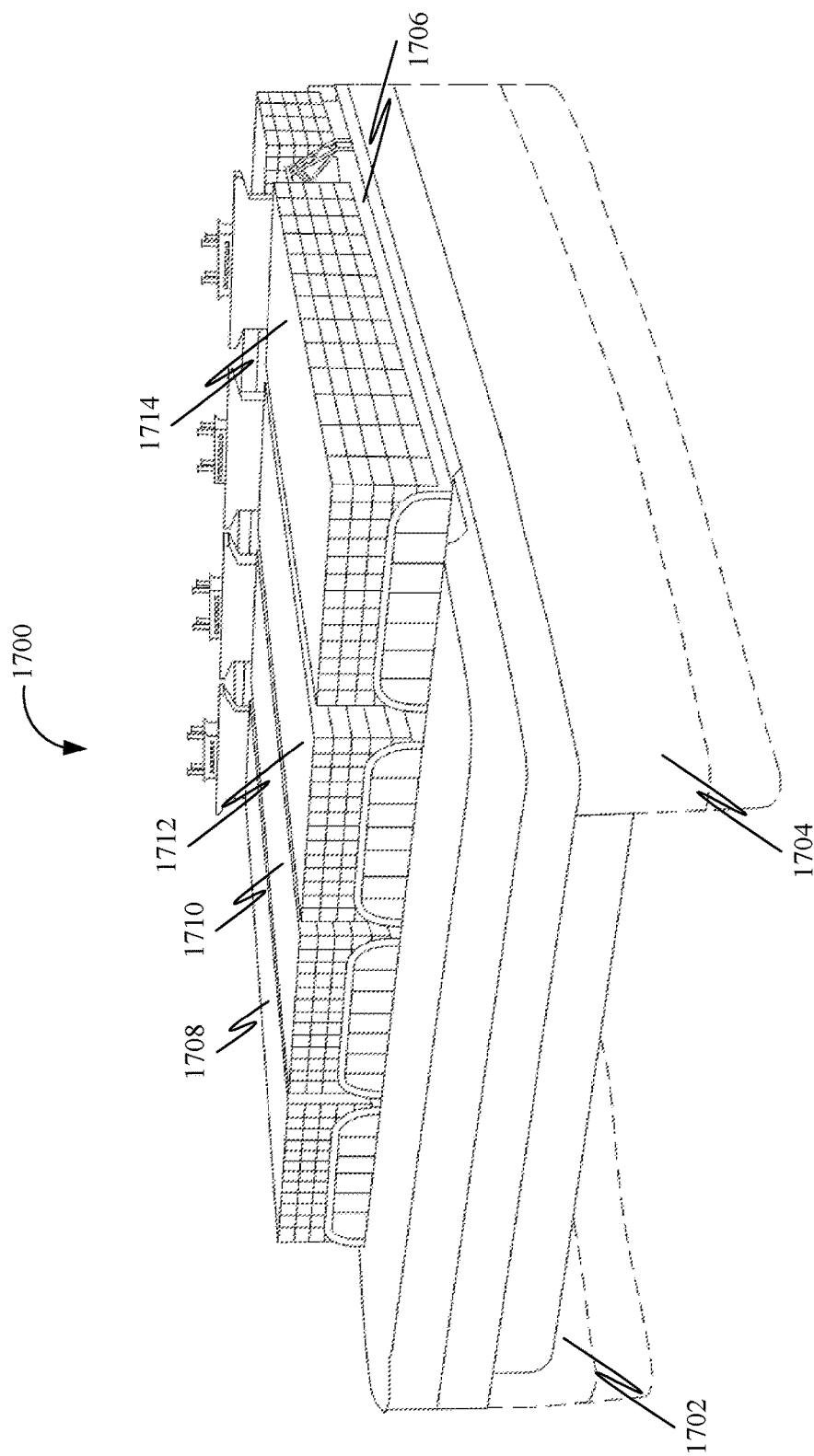
FIG. 17 is a perspective view of a broad-based ship with a plurality of cargoes loaded on a flight deck of the broad-based ship, in accordance with some embodiments.

FIG. 17 is a perspective view of a broad-based ship 1700 with a plurality of cargoes 1708-1714 loaded on a flight deck 1706 of the broad-based ship 1700, in accordance with some embodiments. Further, the broad-based ship 1700 may include one or more hulls 1702-1704. Further, the broad-based ship 1700 may transport the plurality of cargoes 1708-1714.

Figure 18:
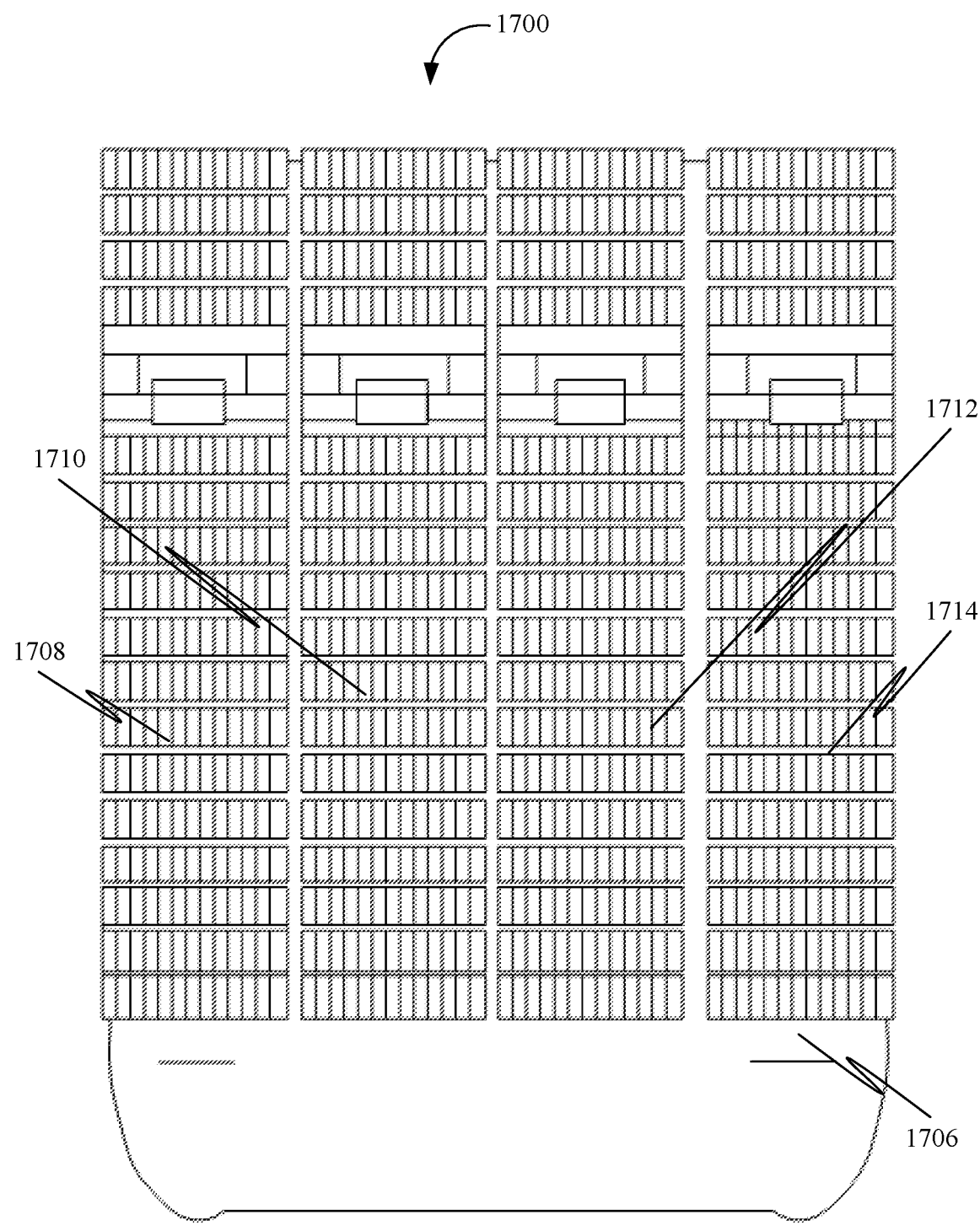
FIG. 18 is a top view of the broad-based ship, in accordance with some embodiments.

FIG. 18 is a top view of the broad-based ship 1700, in accordance with some embodiments.

Figure 19:
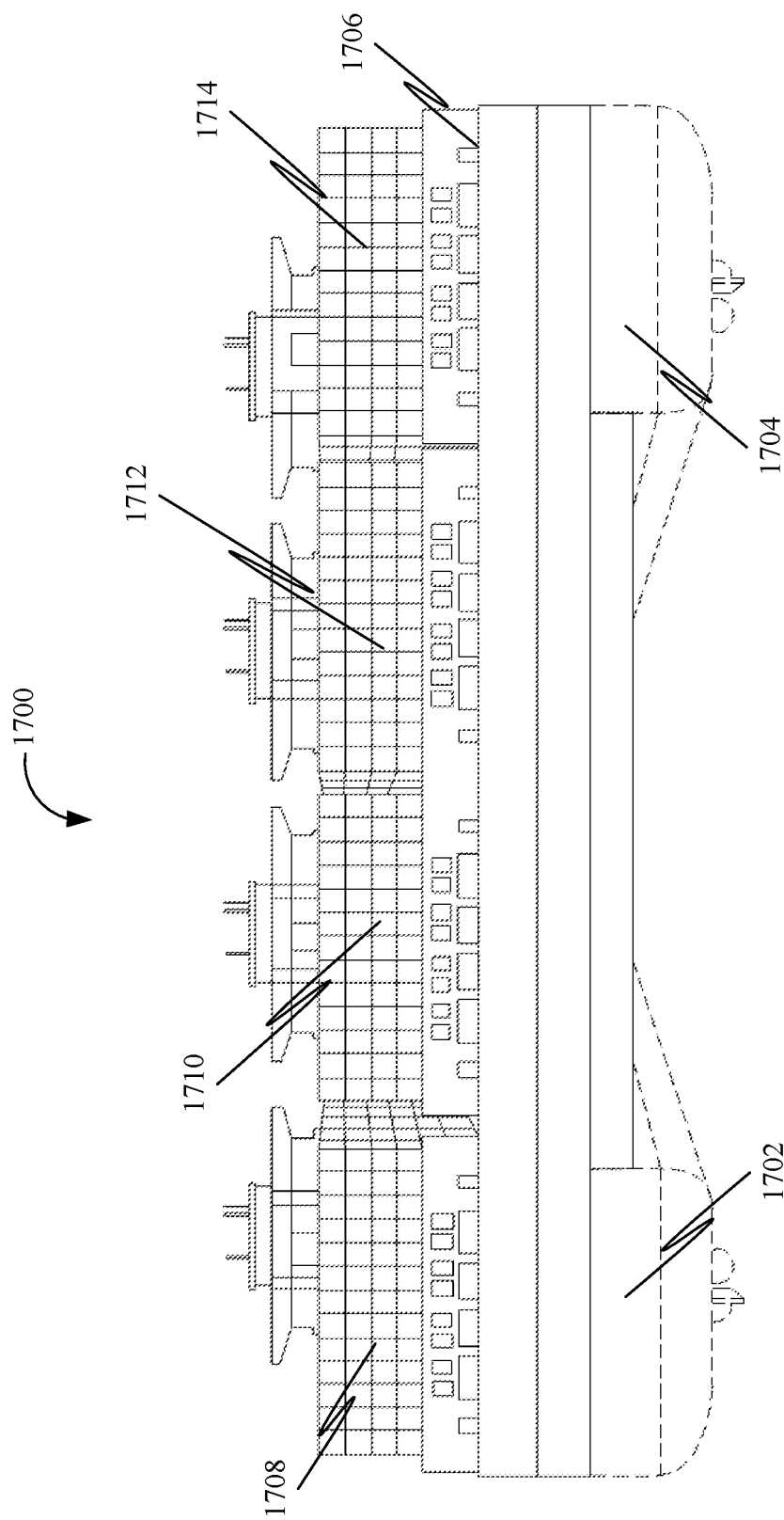
FIG. 19 is a front view of the broad-based ship, in accordance with some embodiments.

FIG. 19 is a front view of the broad-based ship 1700, in accordance with some embodiments.

Figure 20:
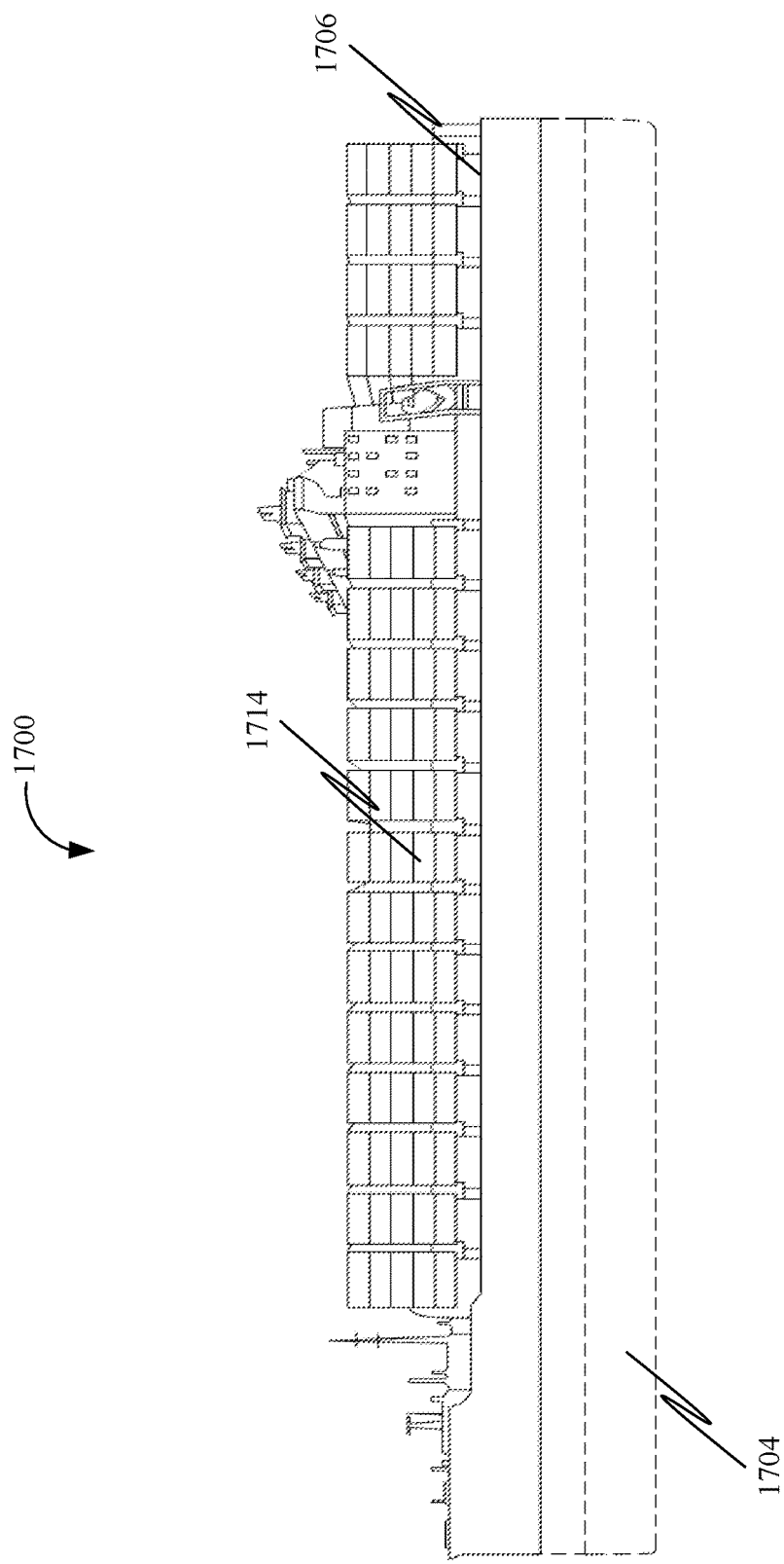
FIG. 20 is a side view of the broad-based ship, in accordance with some embodiments.

FIG. 20 is a side view of the broad-based ship 1700, in accordance with some embodiments.

Figure 21:
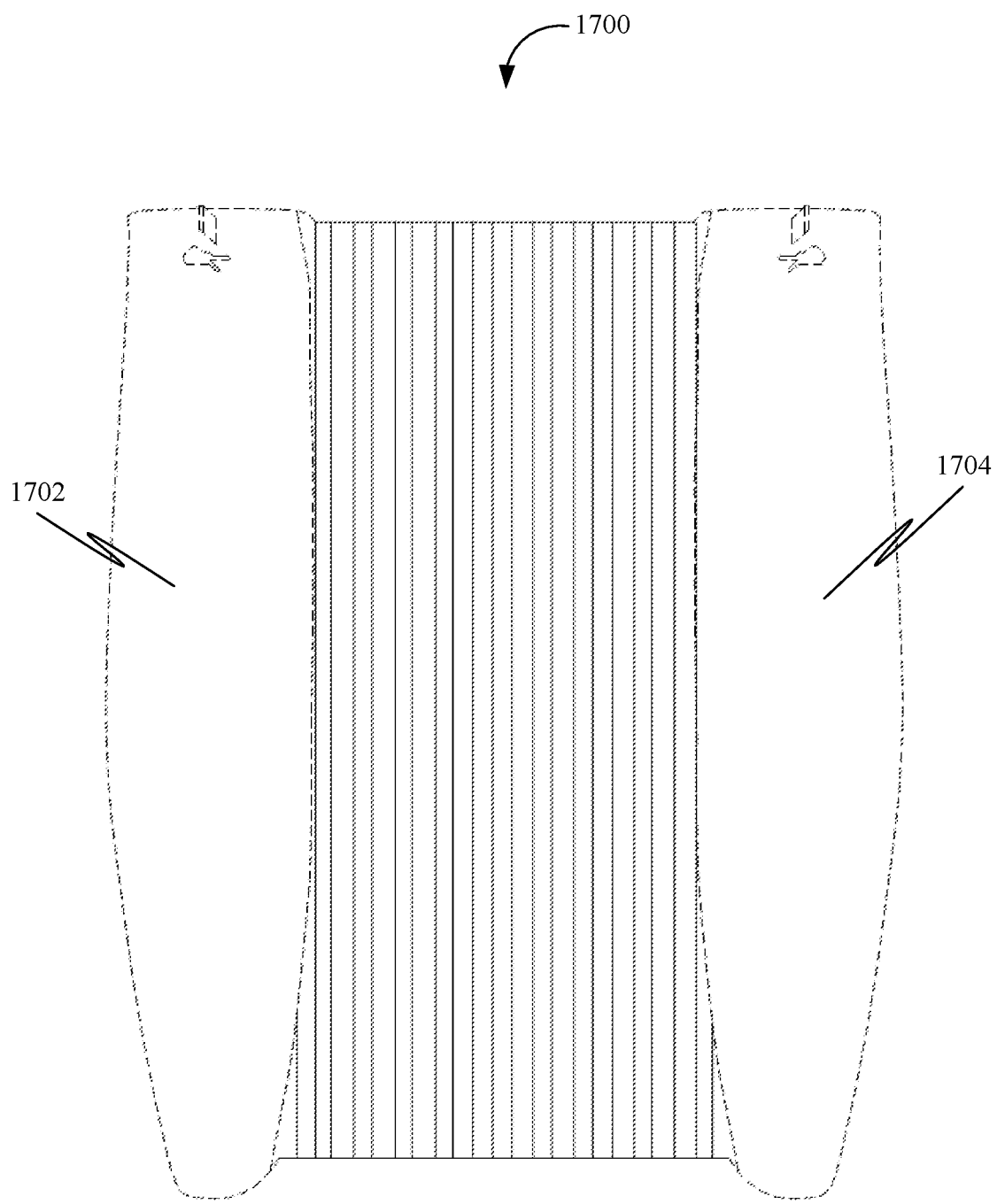
FIG. 21 is a bottom view of the broad-based ship, in accordance with some embodiments.

FIG. 21 is a bottom view of the broad-based ship 1700, in accordance with some embodiments.

Figure 22:
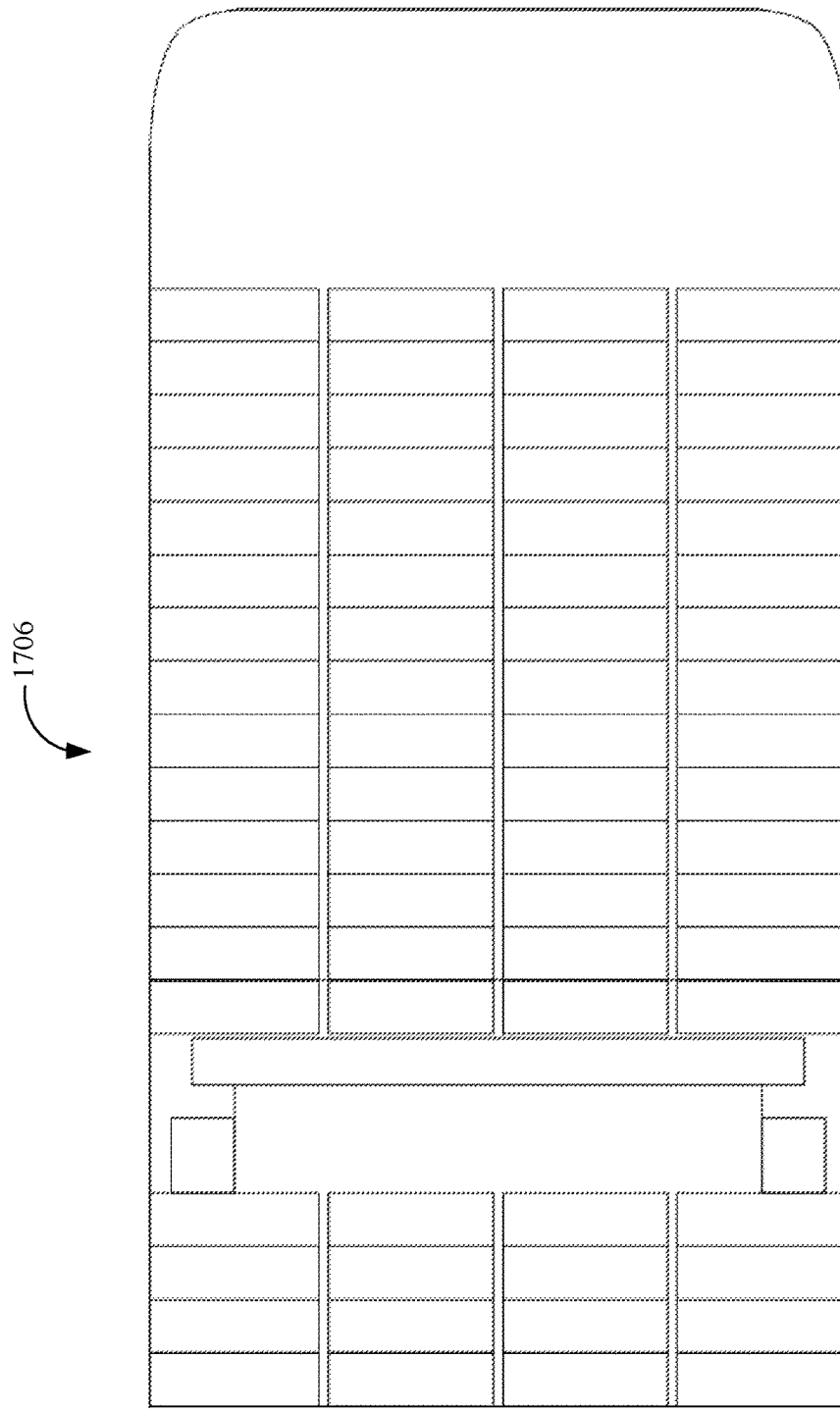
FIG. 22 is a top view of the flight deck of the broad-based ship, in accordance with some embodiments.

FIG. 22 is a top view of the flight deck 1706 of the broad-based ship 1700, in accordance with some embodiments.

Figure 23:
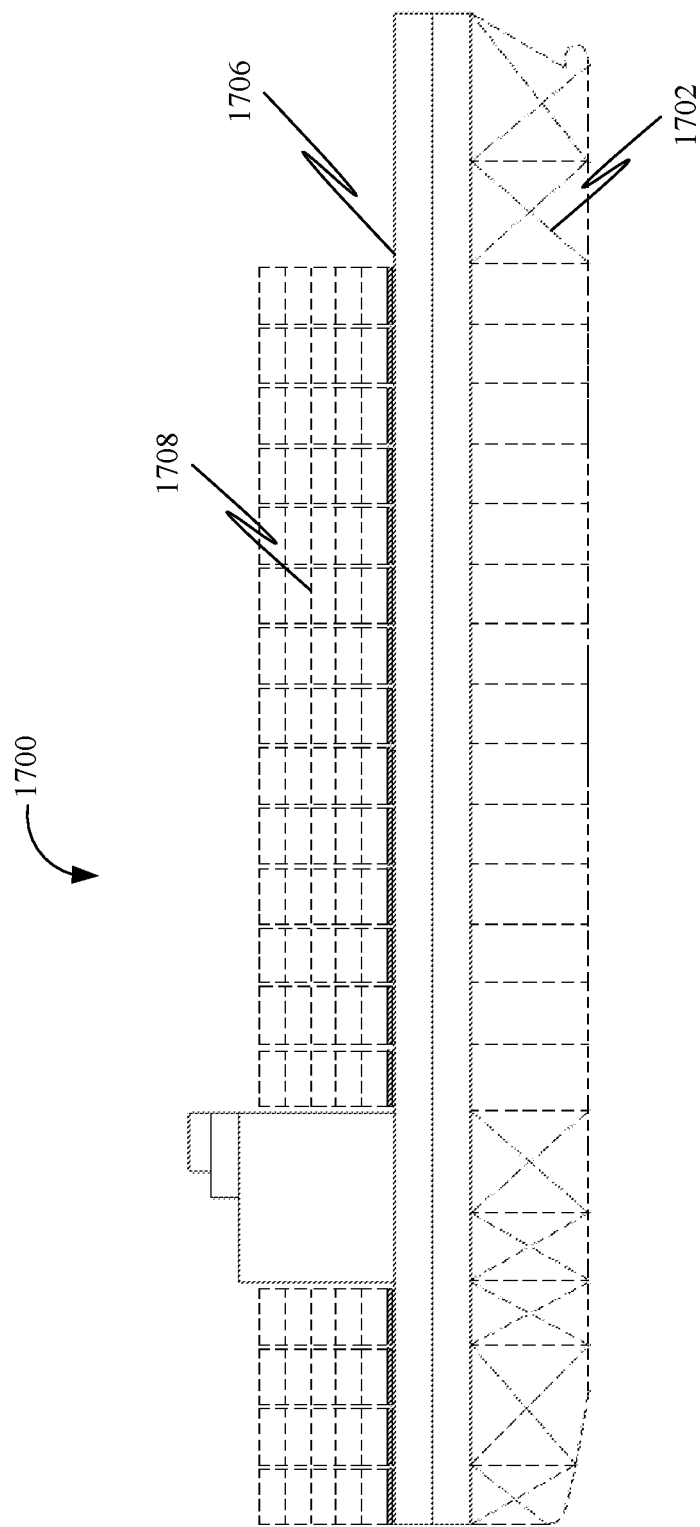
FIG. 23 is a side view of the broad-based ship, in accordance with some embodiments.

FIG. 23 is a side view of the broad-based ship 1700, in accordance with some embodiments.

Figure 24:
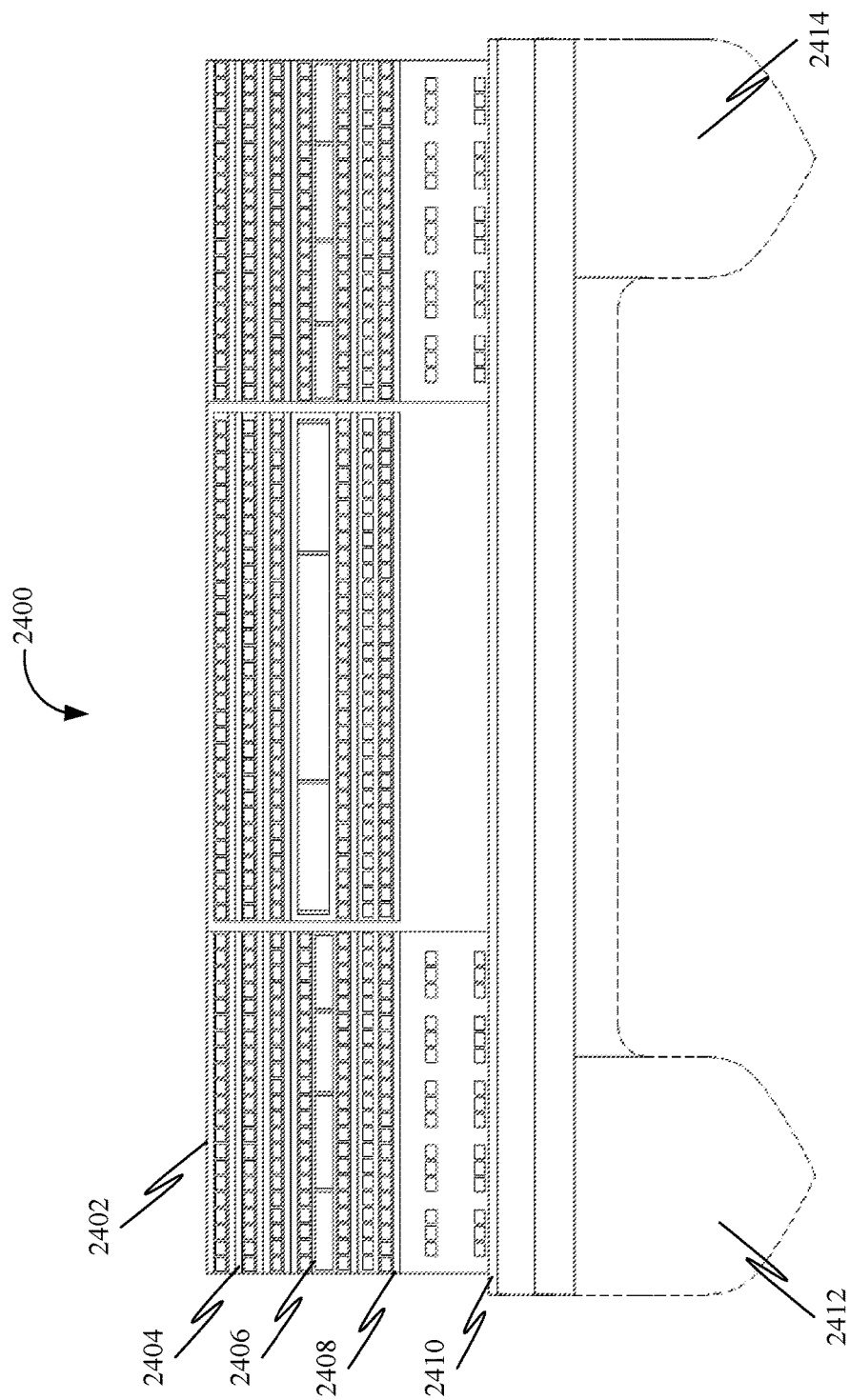
FIG. 24 is a front view of a broad-based ship with a plurality of decks, in accordance with some embodiments.

FIG. 24 is a front view of a broad-based ship 2400 with a plurality of decks 2402-2410, in accordance with some embodiments. Further, the broad-based ship 2400 may include one or more hulls 2412-2414. Further, the plurality of decks 2402-2410 may be supported on the one or more hulls 2412-2414.

Figure 25:
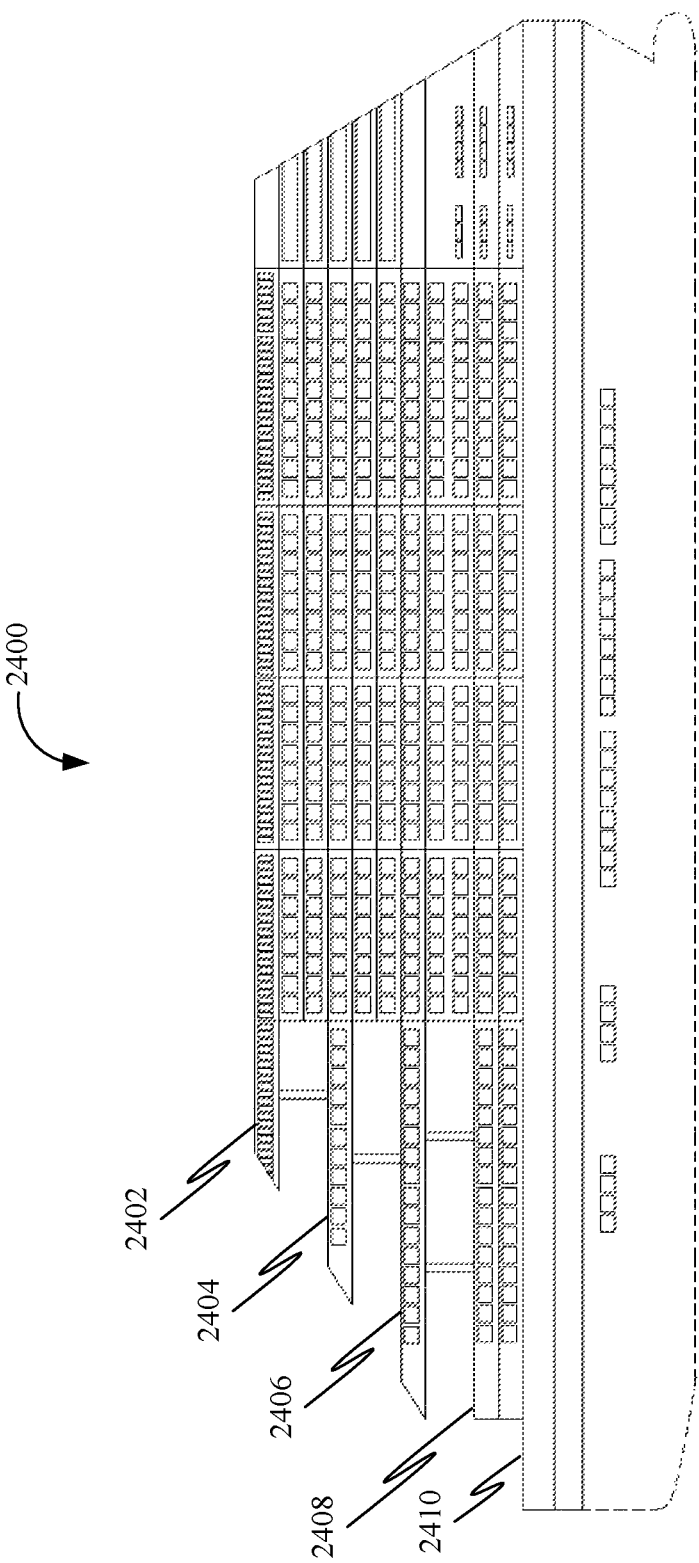
FIG. 25 is a side view of the broad-based ship, in accordance with some embodiments.

FIG. 25 is a side view of the broad-based ship 2400, in accordance with some embodiments.

Figure 26:
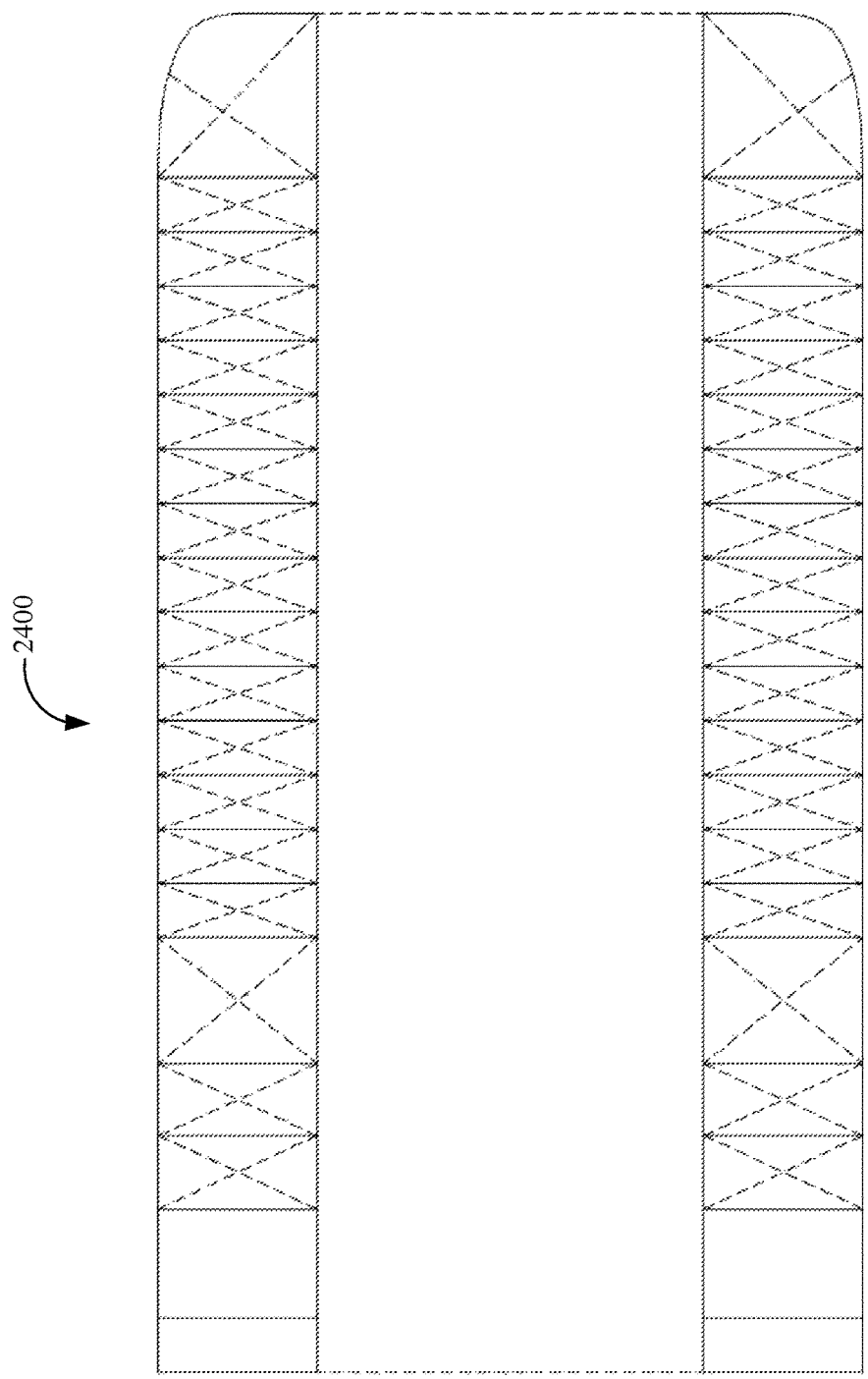
FIG. 26 is a partial view of the broad-based ship without the plurality of decks, in accordance with some embodiments.

FIG. 26 is a partial view of the broad-based ship 2400 without the plurality of decks 2402-2410, in accordance with some embodiments.

Figure 27:
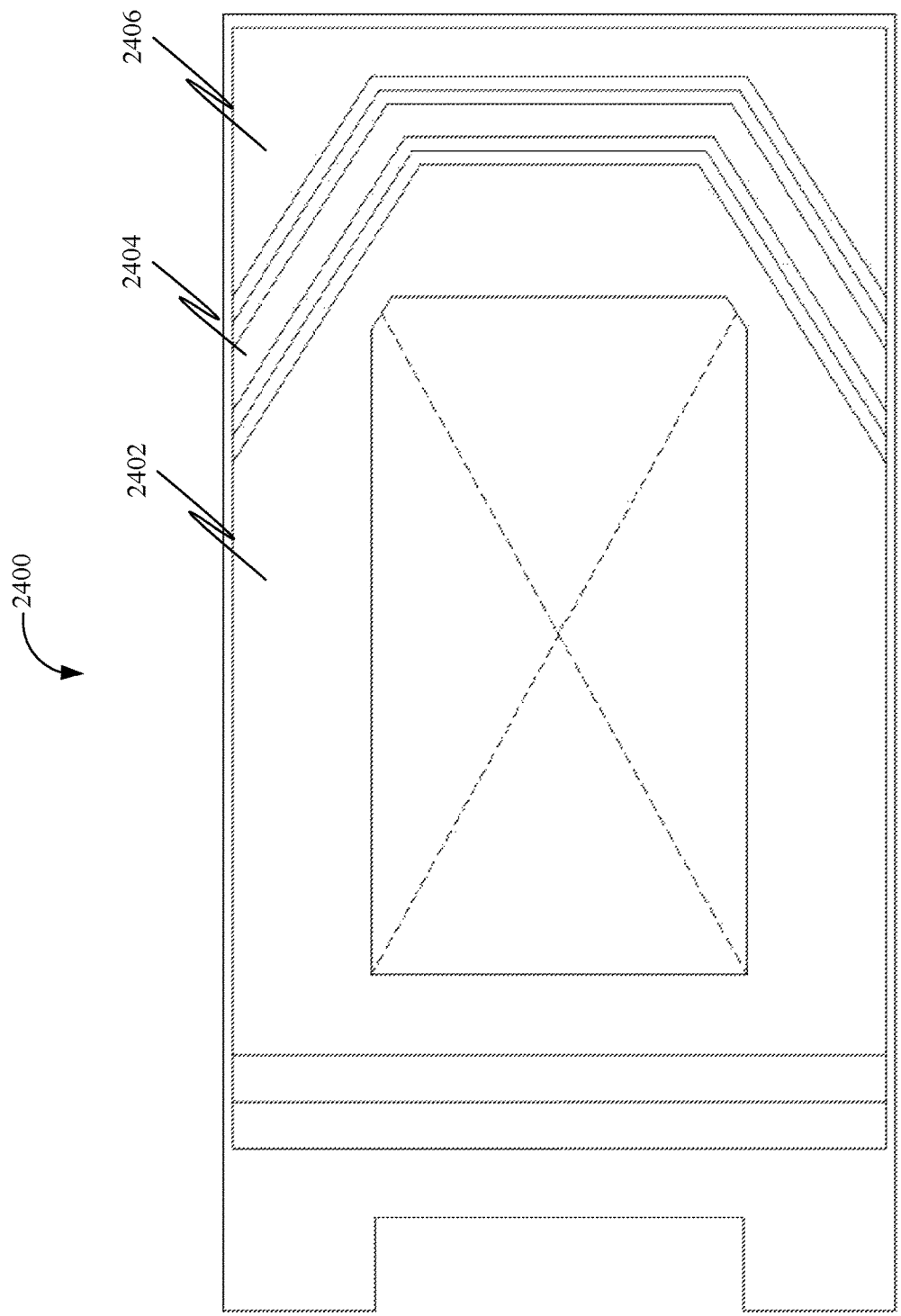
FIG. 27 is a top view of the broad-based ship, in accordance with some embodiments.

FIG. 27 is a top view of the broad-based ship 2400, in accordance with some embodiments.

Figure 28:
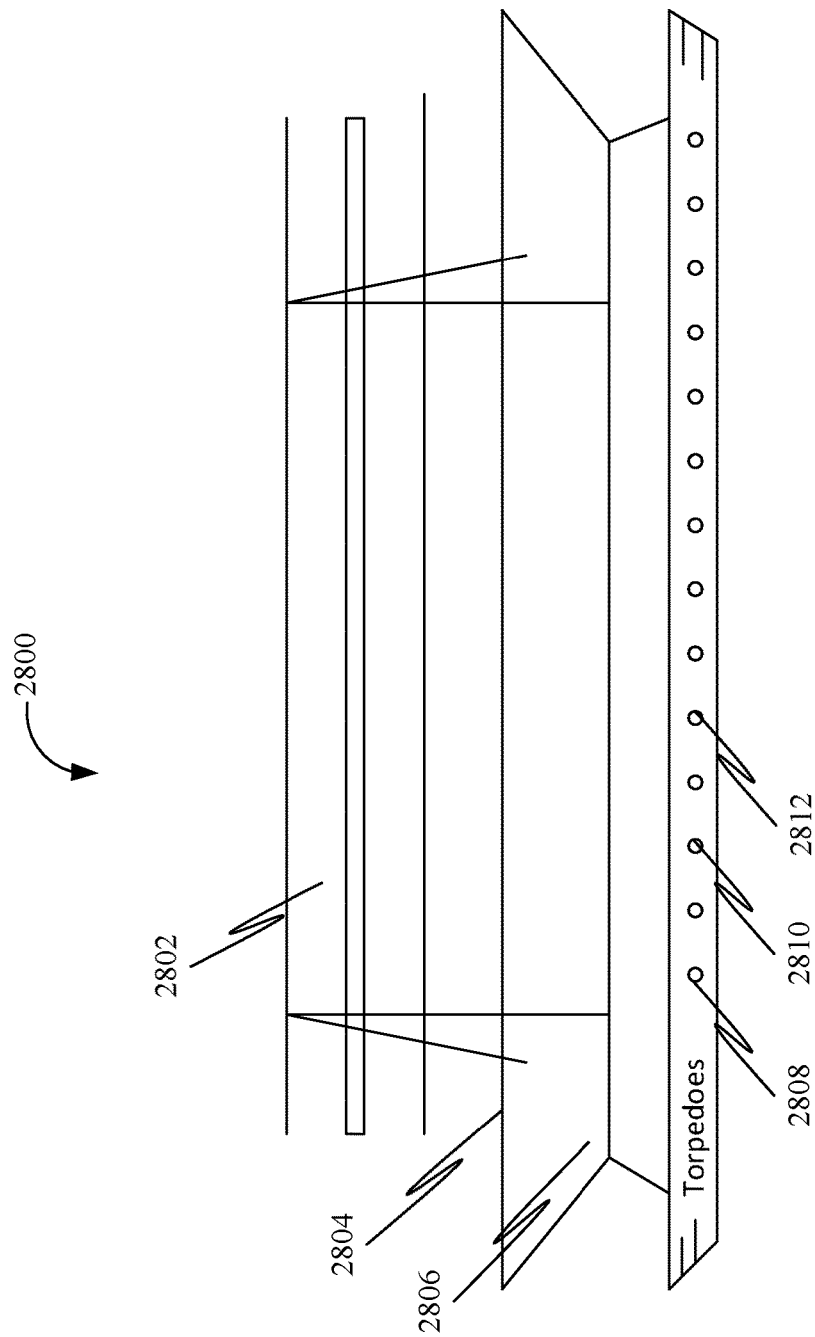
FIG. 28 is a side view of a broad-based ship that may be facilitated for landing and taking off of multiple aircraft, in accordance with some embodiments.

FIG. 28 is a side view of a broad-based ship 2800 that may be facilitated for landing and taking off of multiple aircraft, in accordance with some embodiments. Further, the broad-based ship 2800 may include a flight deck 2802 and a hangar deck 2804. Further, the broad-based ship 2800 may include a plurality of aircraft disposed on the flight deck 2802. Further, the plurality of aircraft may be at least one of a plurality of manned aircraft and a plurality of unmanned aircraft. Further, the plurality of aircraft may include jets, drones, helicopters, etc. Further, the broad-based ship 2800 may include a detachably mountable missile launching assembly 2806. Further, the broad-based ship 2800 may include a plurality of torpedo rooms 2808-2812. Further, the plurality of torpedo rooms 2808-2812 may fire torpedo in every direction.

Figure 29:
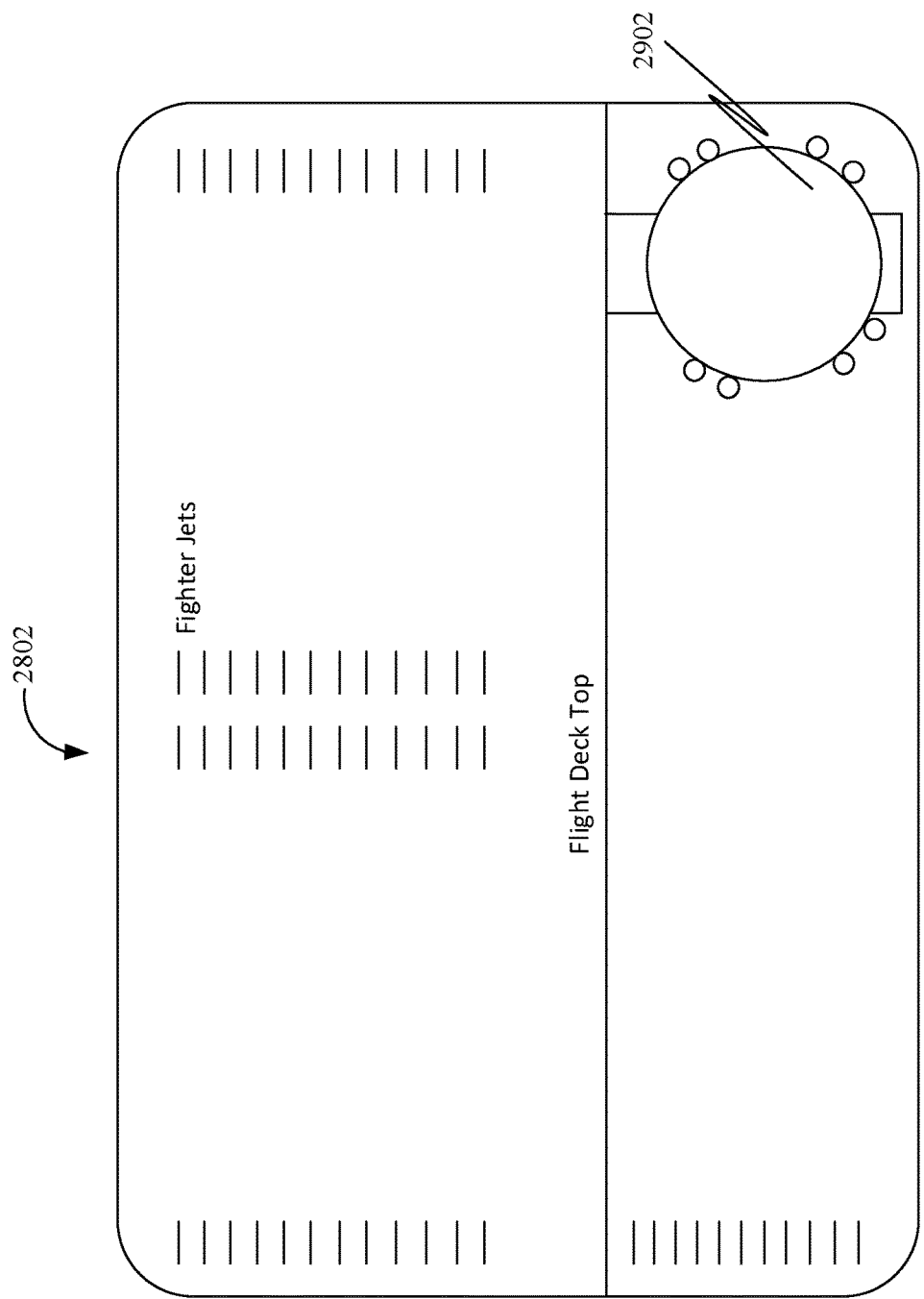
FIG. 29 is a top view of the flight deck of the broad-based ship, in accordance with some embodiments.

FIG. 29 is a top view of the flight deck 2802 of the broad-based ship 2800, in accordance with some embodiments. Further, the broad-based ship 2800 may include a plurality of aircraft disposed on the flight deck 2802. Further, the plurality of aircraft may include jets, drones, helicopters, etc. Further, the broad-based ship 2800 may include a jet reload assembly 2902. Further, the jet reload assembly 2902 may be configured for refueling the plurality of aircraft.

Figure 30:
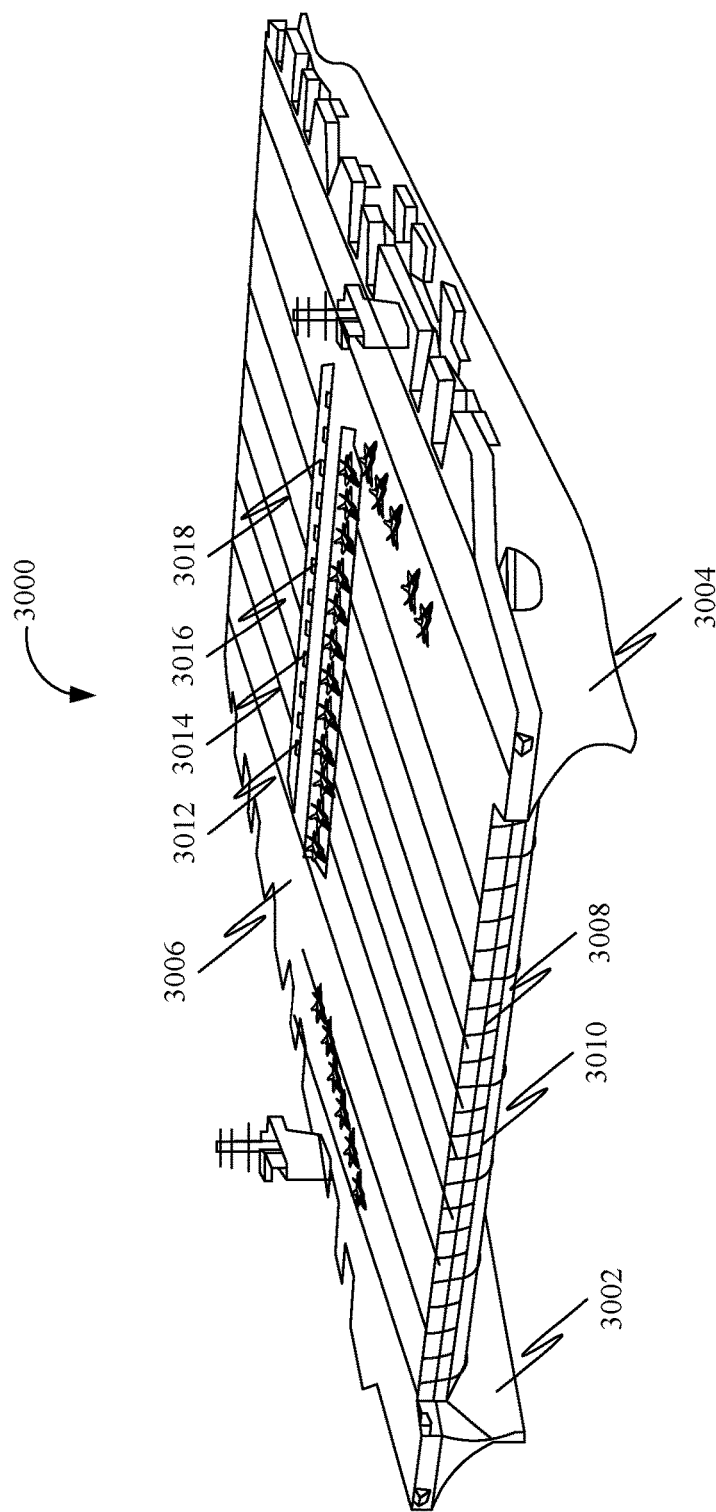
FIG. 30 is a perspective view of a broad-based ship that may be facilitated for landing and taking off of multiple aircraft, in accordance with some embodiments.

FIG. 30 is a perspective view of a broad-based ship 3000 that may be facilitated for landing and taking off of multiple aircraft, in accordance with some embodiments. Further, the broad-based ship 3000 may include one or more hulls 3002-3004, a plurality of decks 3006-3010, and a plurality of elevators 3012-3018.

Figure 31:
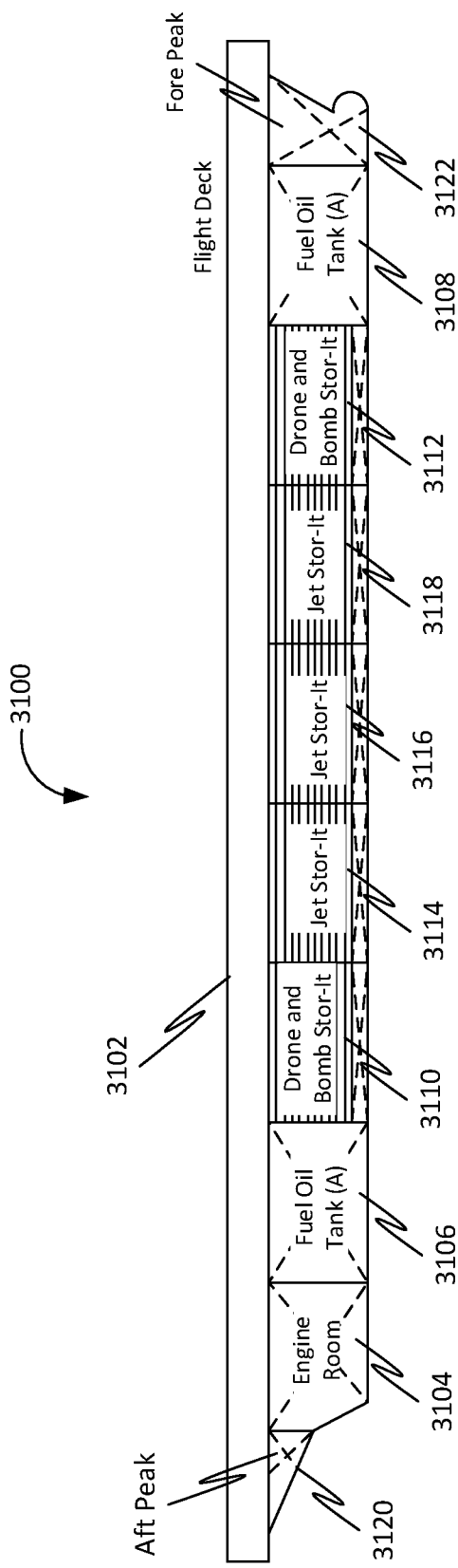
FIG. 31 is a side view of a broad-based ship that may be facilitated for landing and taking off of multiple aircraft, in accordance with some embodiments.

FIG. 31 is a side view of a broad-based ship 3100 that may be facilitated for landing and taking off of multiple aircraft, in accordance with some embodiments. Further, the broad-based ship 3100 may include a plurality of decks. Further, the plurality of decks may include a flight deck 3102. Further, the broad-based ship 3100 may include an engine room 3104, one or more fuel oil tanks 3106-3108, one or more drone and bomb Stor-It 3110-3112, one or more jet Stor-It 3114-3118, an aft peak 3120, and a fore peak 3122.

Figure 32:
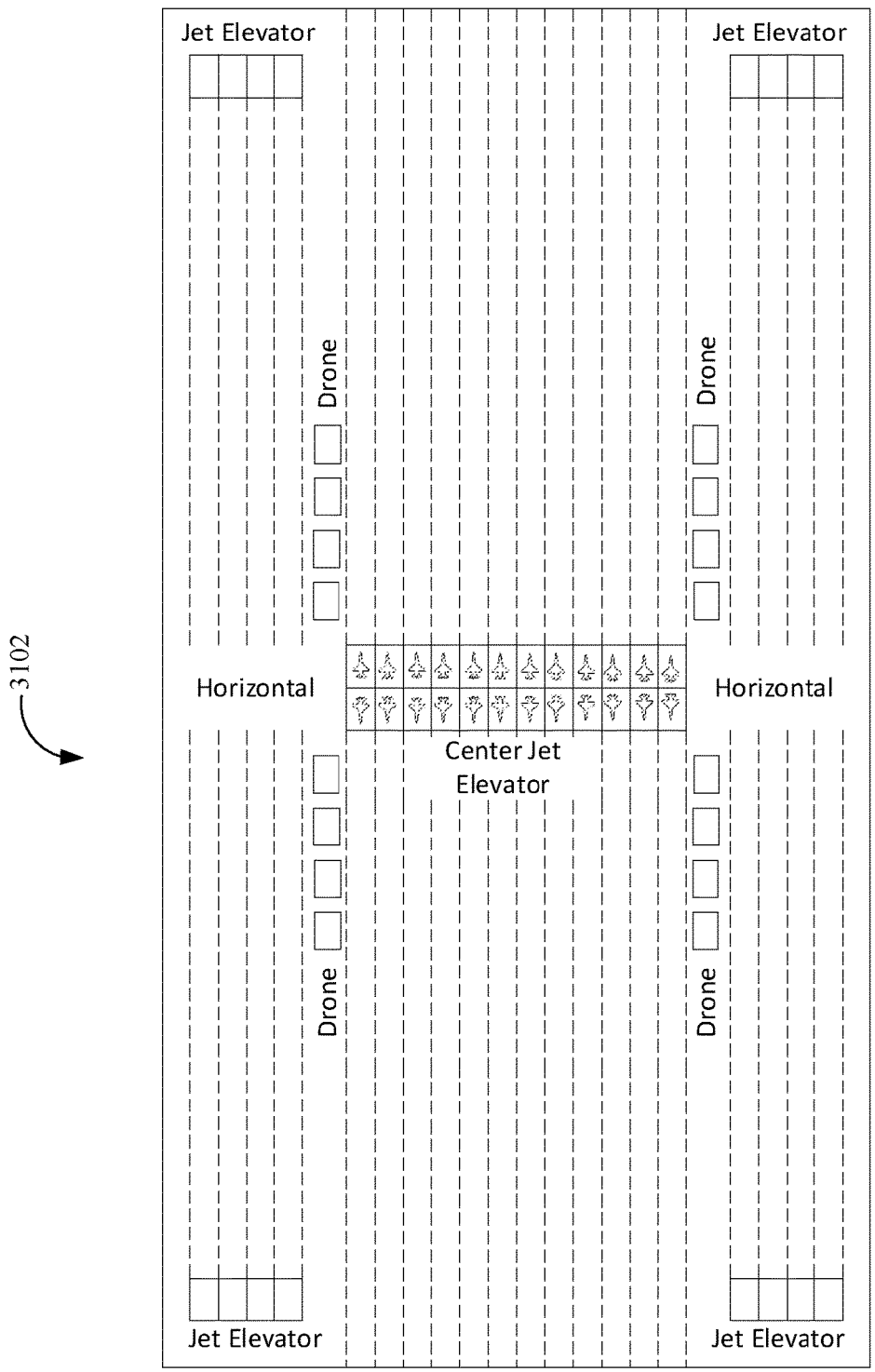
FIG. 32 is a top view of the flight deck of the plurality of decks of the broad-based ship, in accordance with some embodiments.

FIG. 32 is a top view of the flight deck 3102 of the plurality of decks of the broad-based ship 3100, in accordance with some embodiments.

Figure 33:
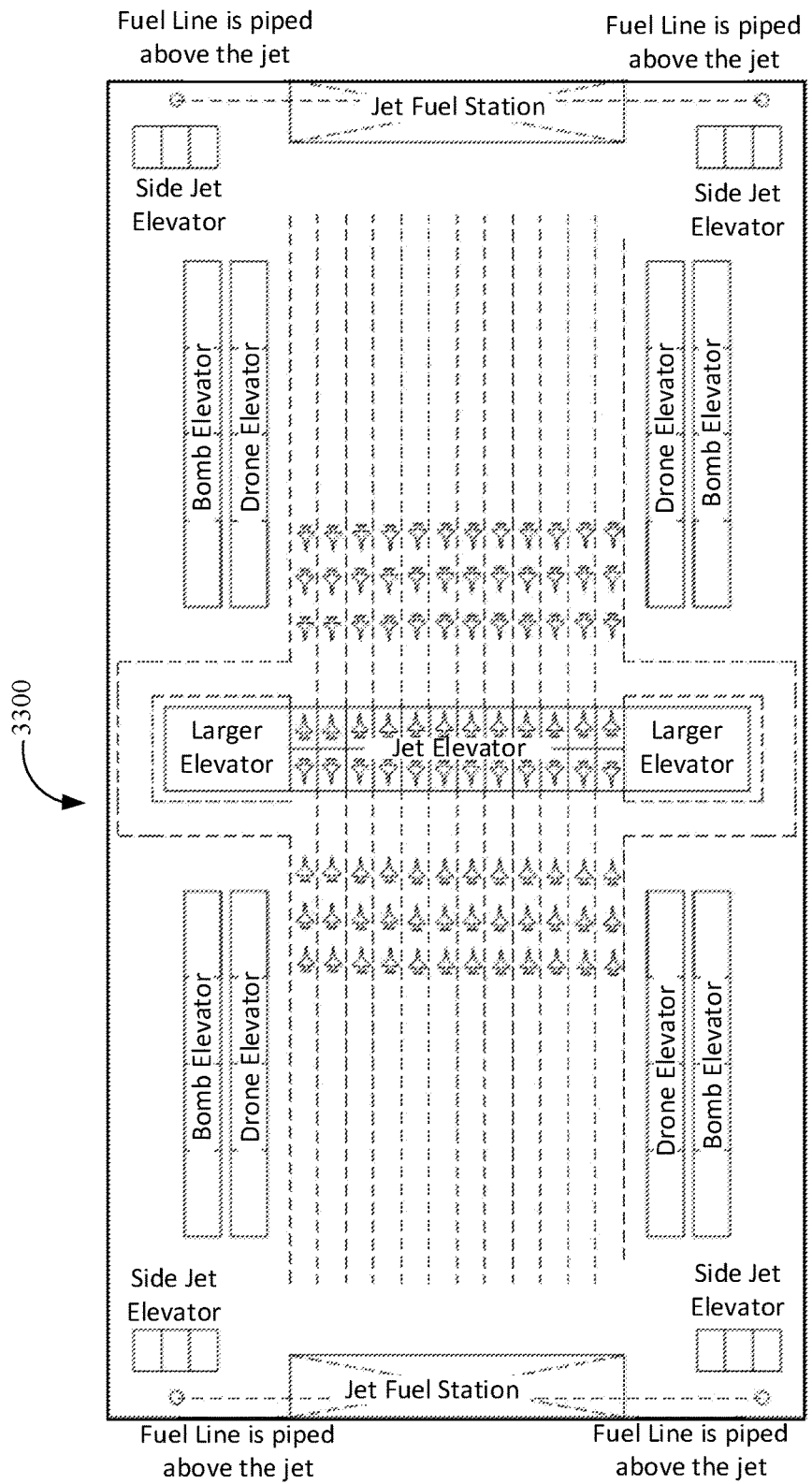
FIG. 33 is a top view of a hangar deck of the plurality of decks of the broad-based ship, in accordance with some embodiments.

FIG. 33 is a top view of a hangar deck 3300 of the plurality of decks of the broad-based ship 3100, in accordance with some embodiments.

Figure 34:
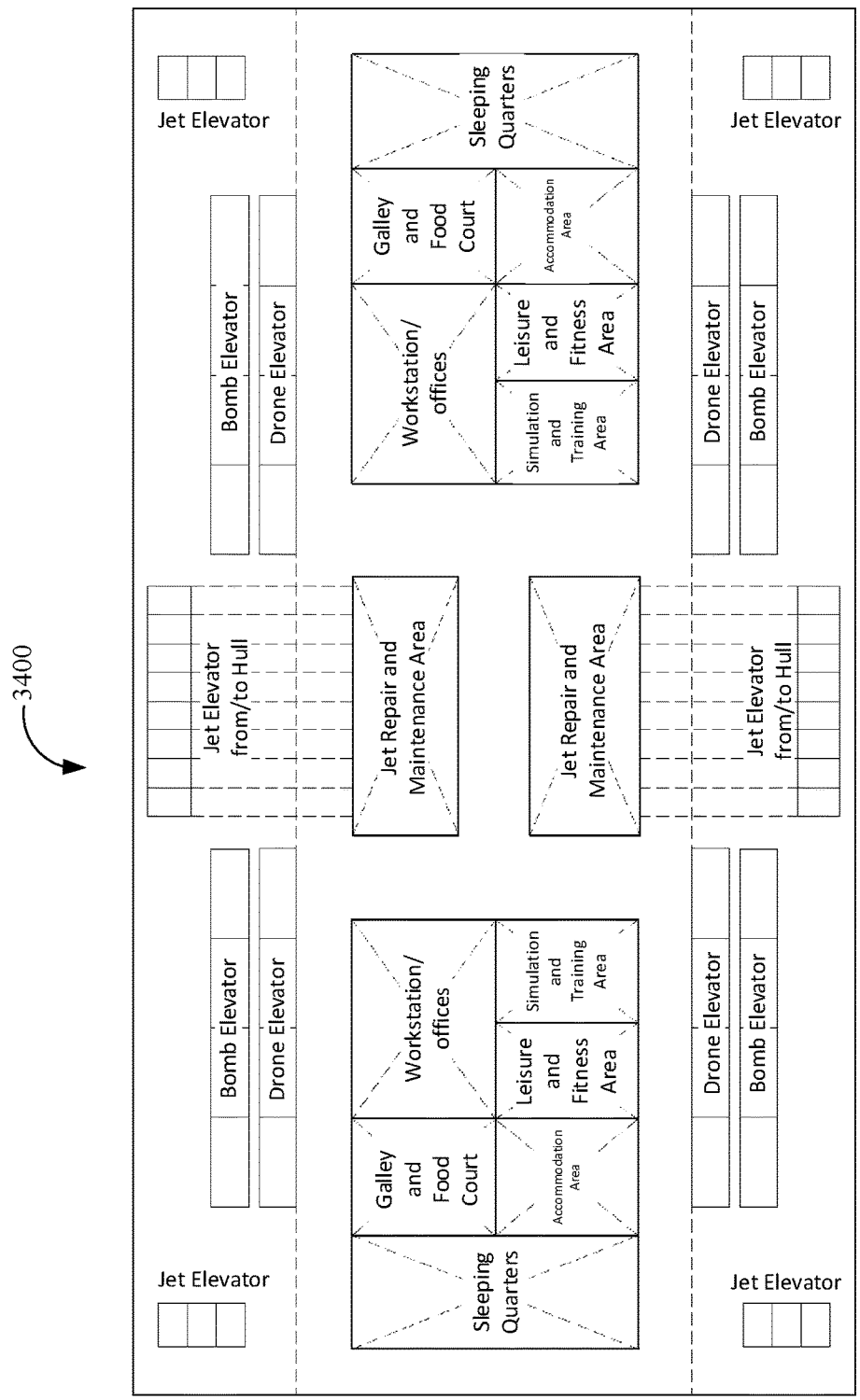
FIG. 34 is a top view of a lower deck of the plurality of decks of the broad-based ship, in accordance with some embodiments.

FIG. 34 is a top view of a lower deck 3400 of the plurality of decks of the broad-based ship 3100, in accordance with some embodiments.

Figure 35:
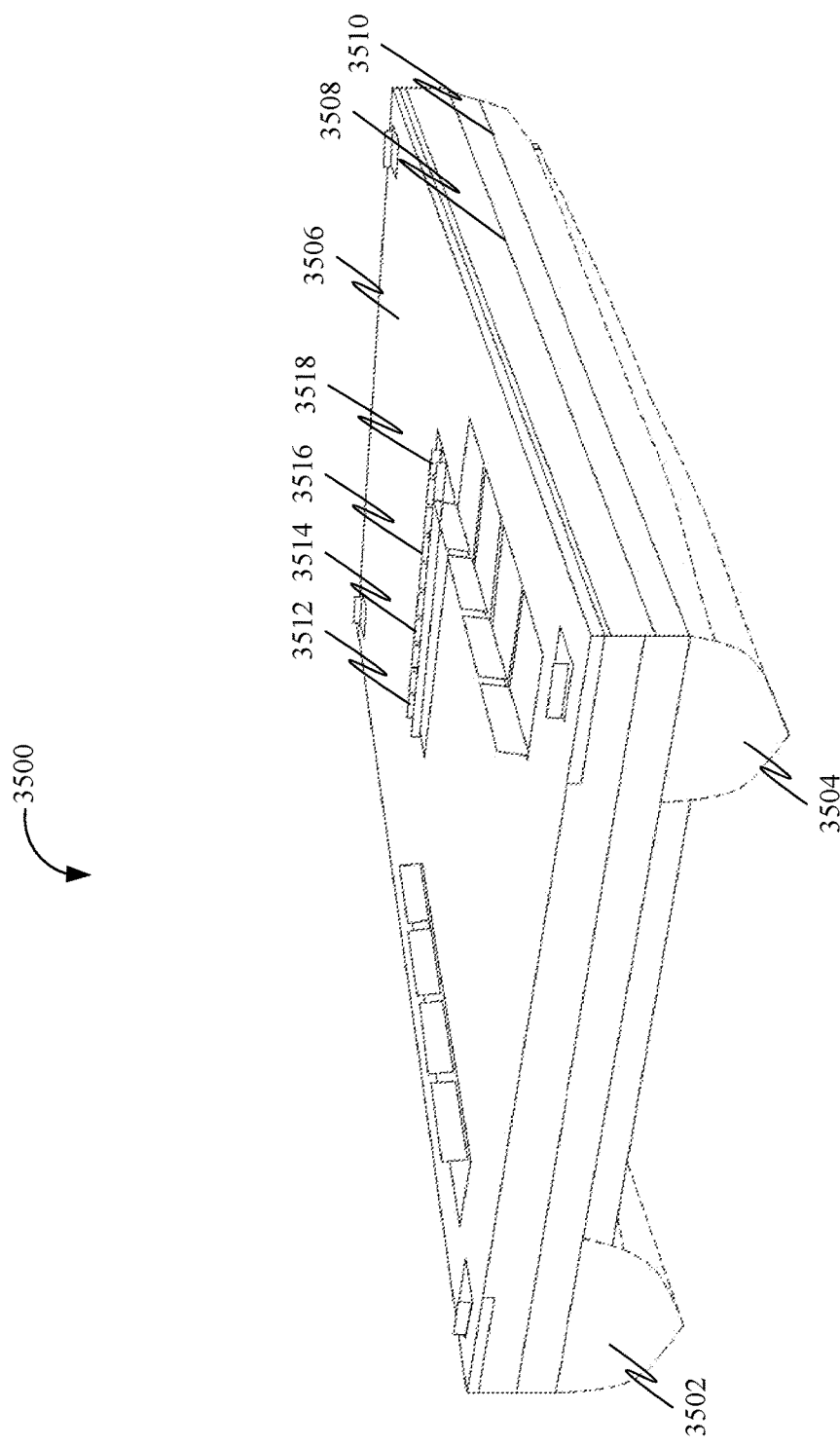
FIG. 35 is a perspective view of a broad-based ship that may be facilitated for landing and taking off of multiple aircraft, in accordance with some embodiments.

FIG. 35 is a perspective view of a broad-based ship 3500 that may be facilitated for landing and taking off of multiple aircraft, in accordance with some embodiments. Further, the broad-based ship 3500 may include one or more hulls 3502-3504, a plurality of decks 3506-3510, and a plurality of elevators 3512-3518.

Further, the one or more hulls 3502-3504 may be configured to be floatably disposable in at least one water body.

Further, the plurality of decks 3506-3510 may be supported on the one or more hulls 3502-3504. Further, the one or more hulls 3502-3504 may be attached to a bottom surface of a deck of the plurality of decks 3506-3510. Further, the plurality of decks 3506-3510 may be vertically spaced forming at least one interior space between the plurality of decks 3506-3510. Further, the plurality of decks 3506-3510 may include a flight deck and at least one lower deck. Further, the at least one lower deck may be vertically disposed below the flight deck. Further, the at least one interior space may include at least one hangar space formed between the flight deck and the at least one lower deck. Further, the at least one hangar space may be configured for housing a plurality of aircraft. Further, the housing may include disposing the plurality of aircraft on the at least one lower deck. Further, the flight deck may include a plurality of airstrips disposed on an upper flight deck surface of the flight deck. Further, the plurality of airstrips may be configured for allowing at least one of landing and taking off of the plurality of aircraft on the plurality of airstrips simultaneously. Further, the plurality of airstrips may include at least 24 airstrips. Further, the at least 24 airstrips allows the at least one of the landing and the taking off of at least 24 aircraft from the at least 24 airstrips simultaneously.

Further, the plurality of elevators 3512-3518 may be disposed in the at least one hangar space. Further, the plurality of elevators 3512-3518 may be configured for transporting the plurality of aircraft between the at least one lower deck and the flight deck simultaneously. Further, the transporting may include transferring the plurality of aircraft from the at least one lower deck to the flight deck simultaneously. Further, the taking off of the plurality of aircraft simultaneously may be based on the transferring of the plurality of aircraft from the at least one lower deck to the flight deck. Further, the transporting may include transferring the plurality of aircraft from the flight deck to the at least one lower deck. Further, the housing of the plurality of aircraft may be based on the transferring of the plurality of aircraft from the flight deck to the at least one lower deck.

Further, in some embodiments, the one or more hulls 3502-3504 may be arranged in at least one hull configuration on the bottom surface of the deck for steadily disposing the broad-based ship 3500 on the at least one water body. Further, the at least one of the landing and the taking off the plurality of aircraft from the plurality of airstrips simultaneously may be based on the steadily disposing of the broad-based ship 3500. Further, in an embodiment, a hull configuration of the at least one hull configuration of the one or more hulls 3502-3504 on the bottom surface of the deck corresponds to a payload capacity of the broad-based ship 3500. Further, the at least one of the landing and the taking off of the plurality of aircraft simultaneously may be based on the payload capacity. Further, in an embodiment, a hull configuration of the at least one hull configuration of the one or more hulls 3502-3504 on the bottom surface of the deck corresponds to a submerged volume of the one or more hulls 3502-3504 in the water of the at least one water body. Further, a propelling speed of the broad-based ship 3500 may be based on the submerged volume of the one or more hulls 3502-3504.

Further, in some embodiments, the one or more hulls 3502-3504 may include a first hull and a second hull. Further, the first hull may be attached to a first peripheral side of the bottom surface of the deck. Further, the second hull may be attached to a second peripheral side of the bottom surface of the deck. Further, the first peripheral side of the bottom surface opposes the second peripheral side of the bottom surface.

Further, in some embodiments, the flight deck may include a flight deck length and a flight deck breadth defining the upper flight deck surface. Further, the at least one of the landing and the taking off of the plurality of aircraft may be based on the flight deck length and the flight deck breadth. Further, in an embodiment, the flight deck length may be at least 10580 feet and the flight deck breadth may be at least 5288 feet. Further, in an embodiment, at least one of the landing of the plurality of aircraft on the plurality of airstrips does not require a plurality of landing cables and the taking of the plurality of aircraft from the plurality of airstrips does not require a plurality of pulley assemblies based on the flight deck length and flight deck breadth.

Further, in some embodiments, the transporting of the plurality of aircraft between the at least one lower deck and the flight deck may be independently and simultaneously.

Figure 36:
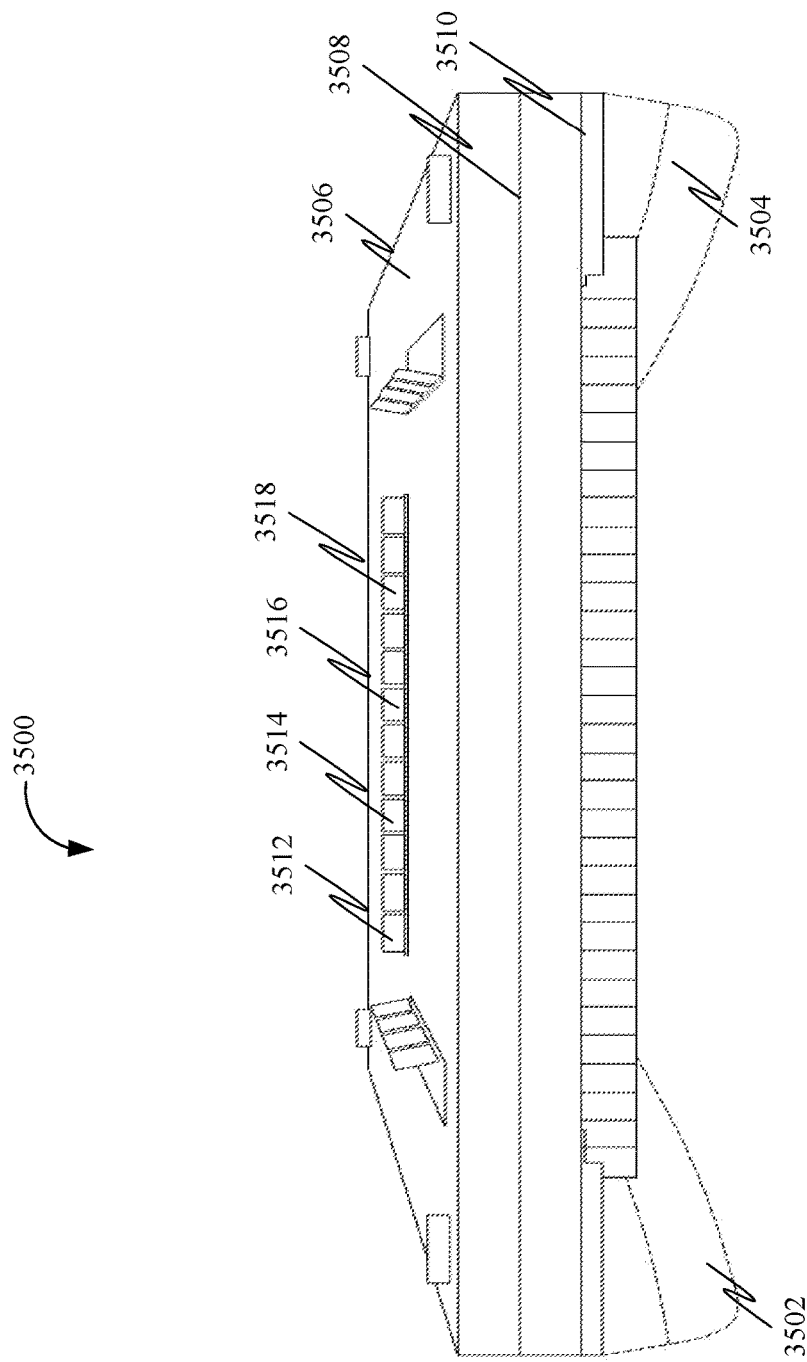
FIG. 36 is a front view of the broad-based ship, in accordance with some embodiments.

FIG. 36 is a front view of the broad-based ship 3500, in accordance with some embodiments.

Figure 37:
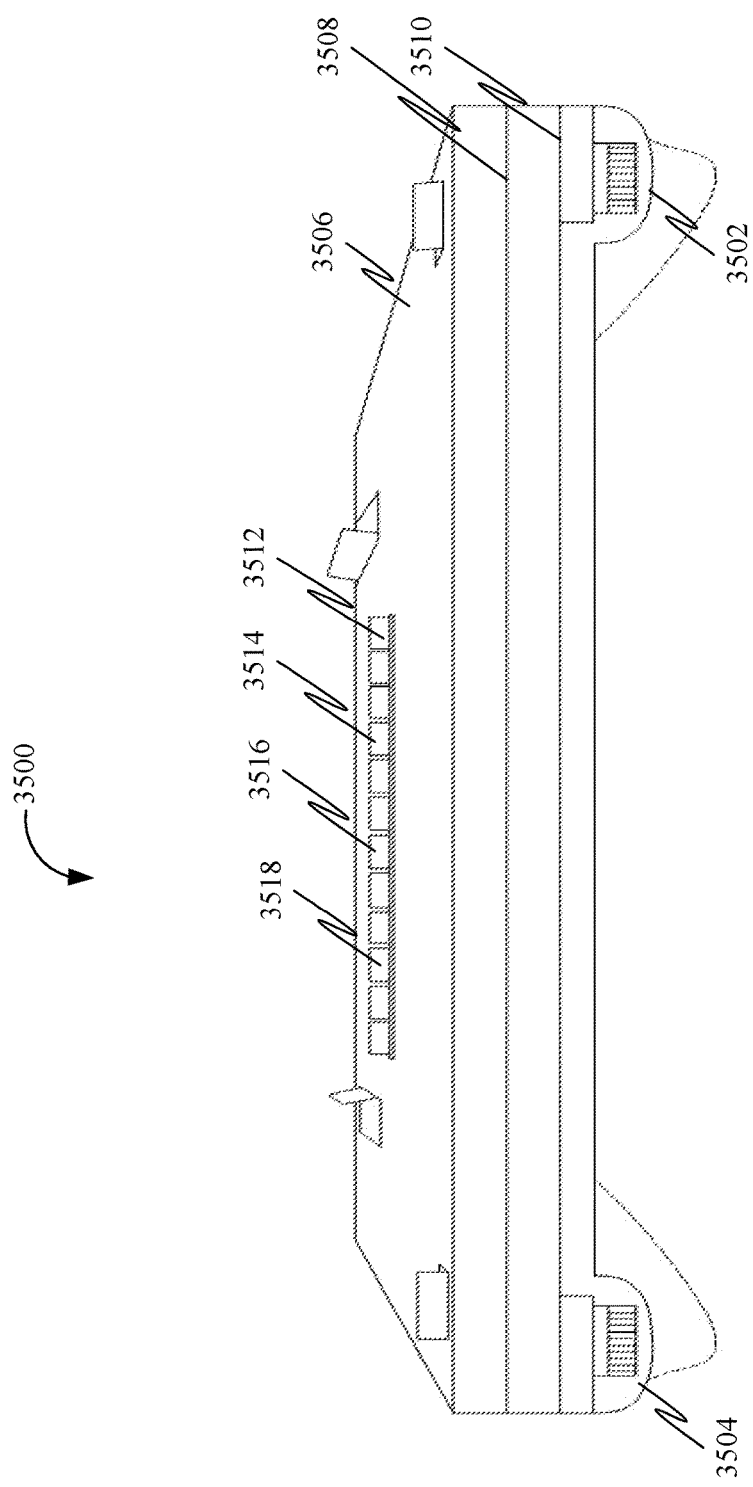
FIG. 37 is a rear view of the broad-based ship, in accordance with some embodiments.

FIG. 37 is a rear view of the broad-based ship 3500, in accordance with some embodiments.

Figure 38:
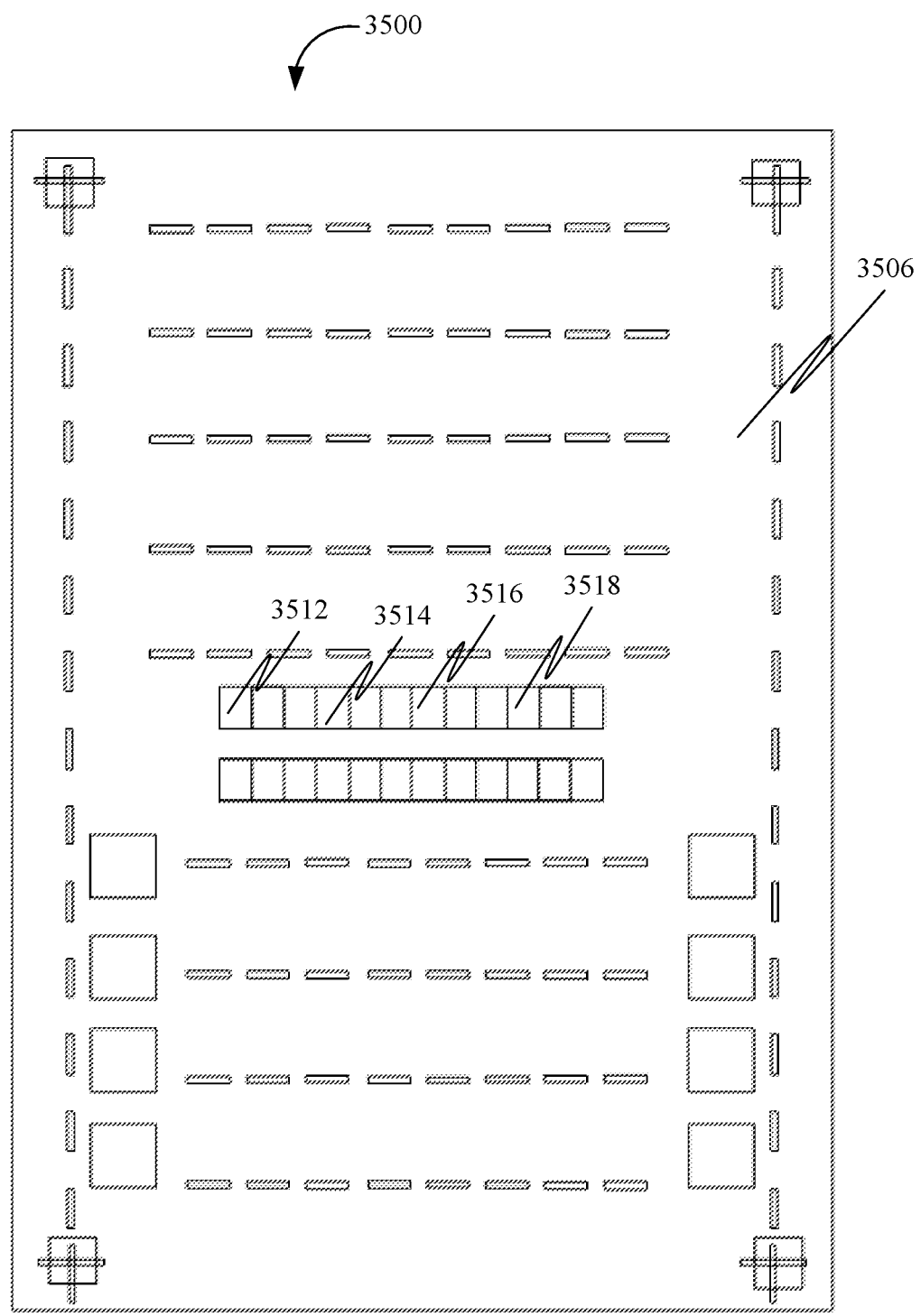
FIG. 38 is a top view of the broad-based ship, in accordance with some embodiments.

FIG. 38 is a top view of the broad-based ship 3500, in accordance with some embodiments.

Figure 39:
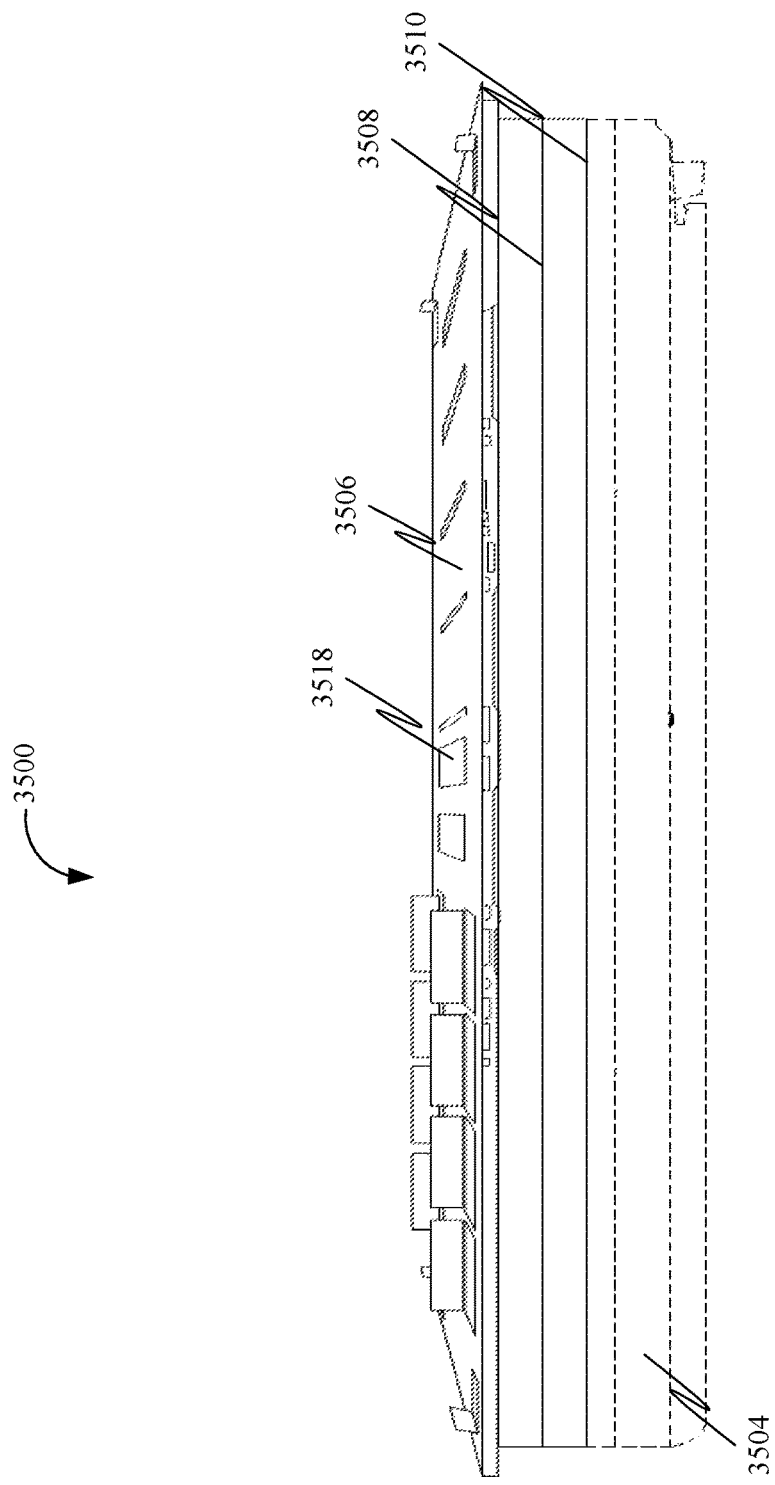
FIG. 39 is a side view of the broad-based ship, in accordance with some embodiments.

FIG. 39 is a side view of the broad-based ship 3500, in accordance with some embodiments.

Figure 40:
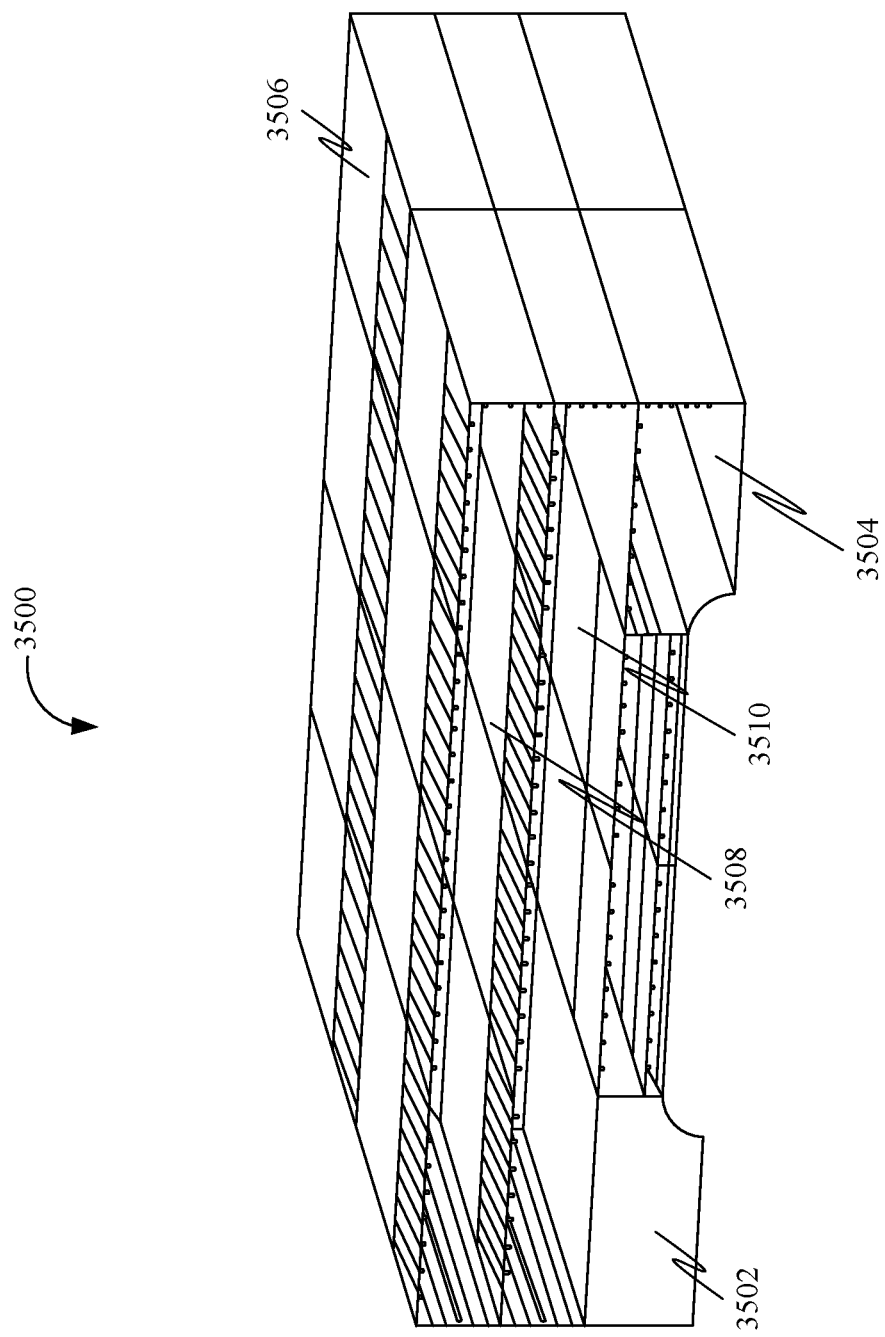
FIG. 40 is a cross-sectional perspective view of the broad-based ship, in accordance with some embodiments.

FIG. 40 is a cross-sectional perspective view of the broad-based ship 3500, in accordance with some embodiments.

Figure 41:
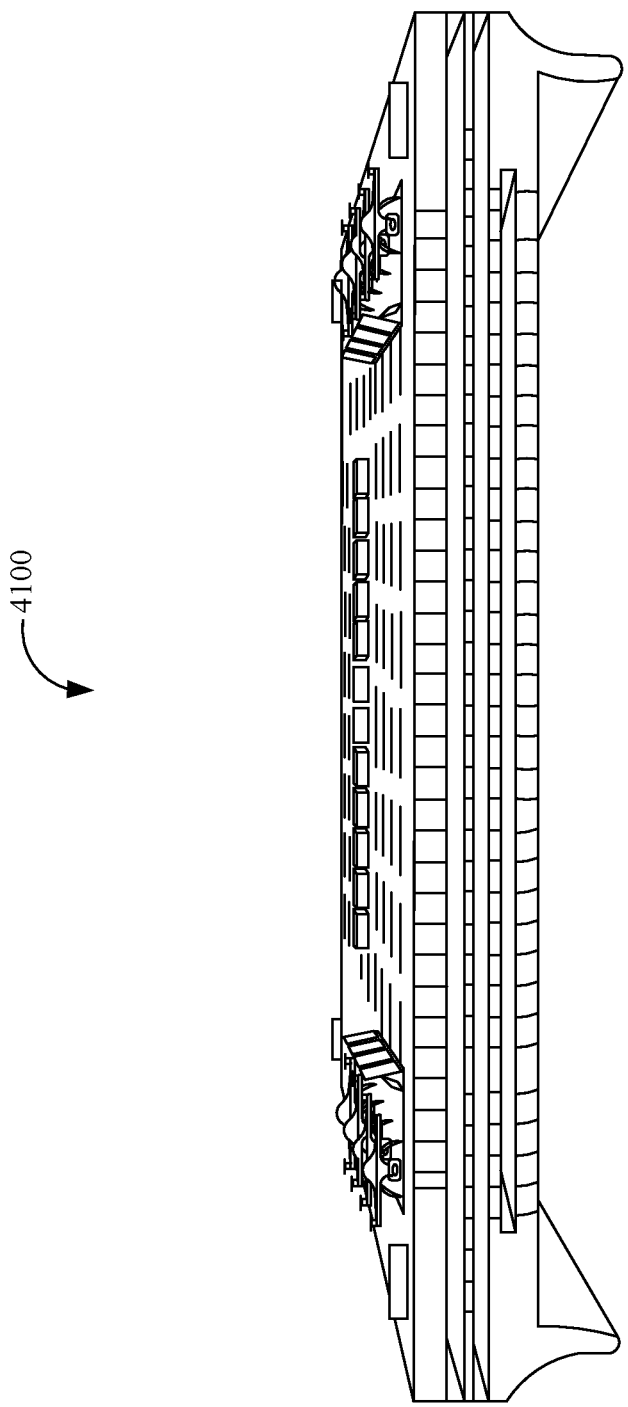
FIG. 41 is a front view of a broad-based ship that may be facilitated for landing and taking off of multiple aircraft, in accordance with some embodiments.

FIG. 41 is a front view of a broad-based ship 4100 that may be facilitated for landing and taking off of multiple aircraft, in accordance with some embodiments.

Figure 42:
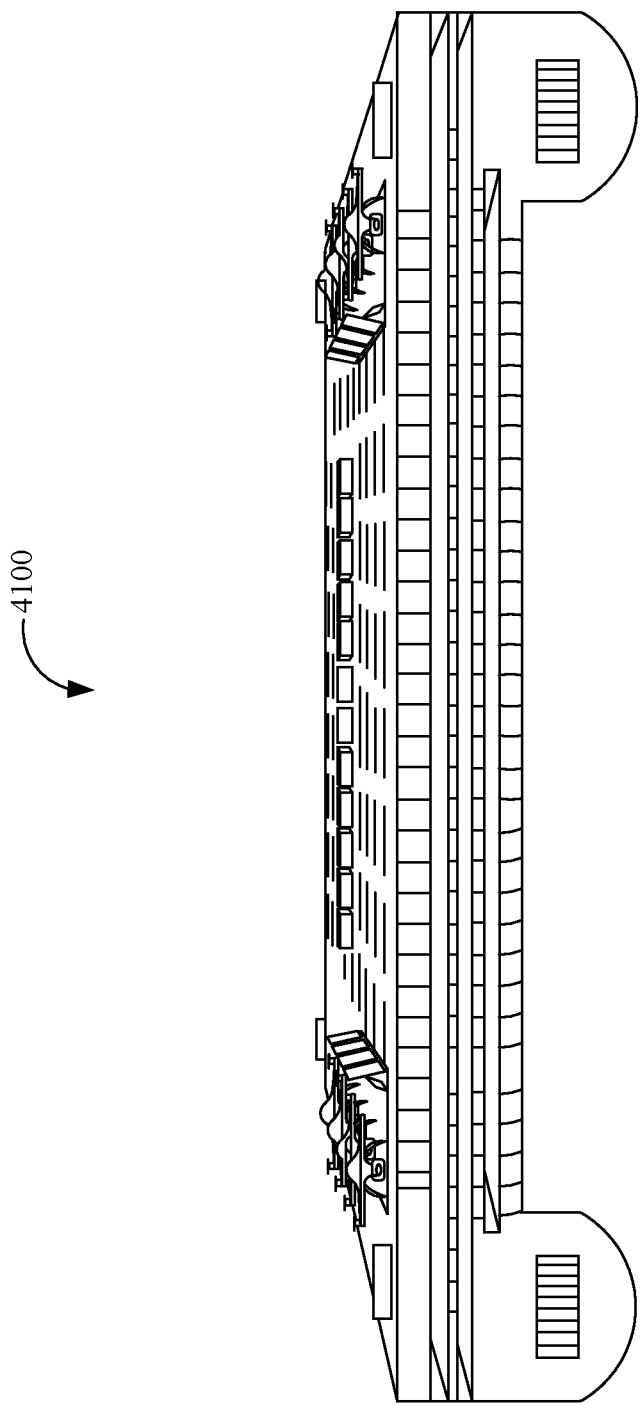
FIG. 42 is a rear view of the broad-based ship, in accordance with some embodiments.

FIG. 42 is a rear view of the broad-based ship 4100, in accordance with some embodiments.

Figure 43:
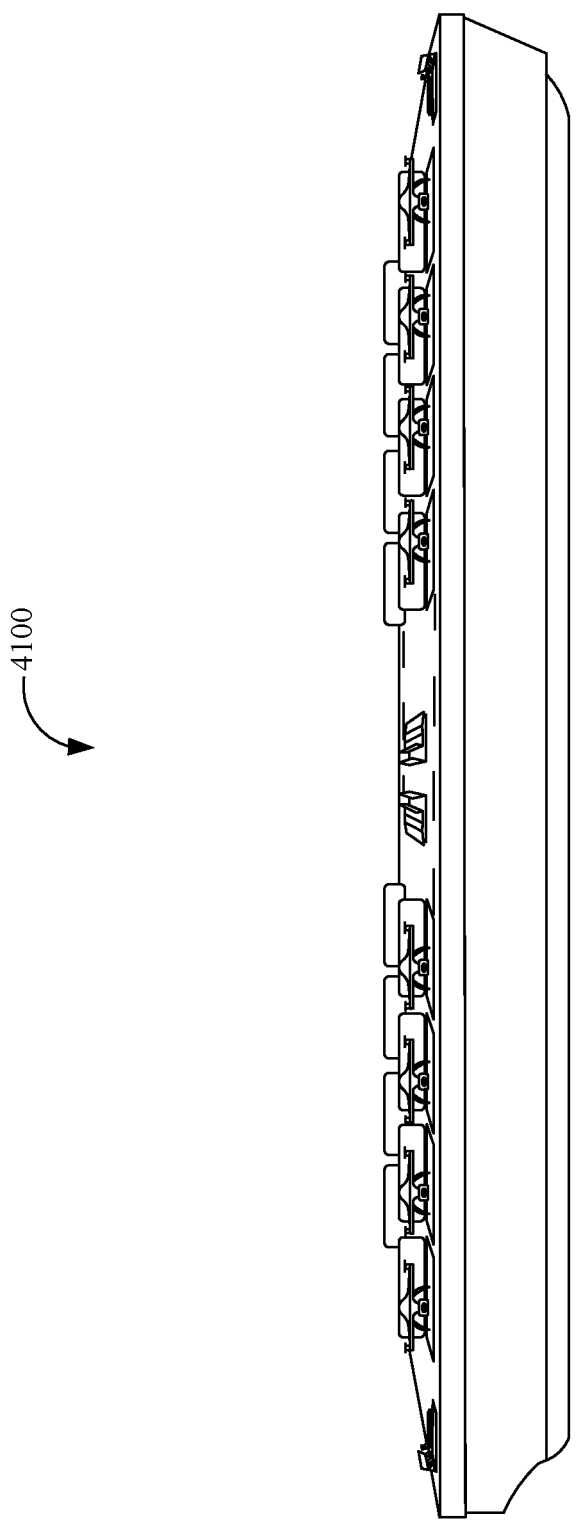
FIG. 43 is a side view of the broad-based ship, in accordance with some embodiments.

FIG. 43 is a side view of the broad-based ship 4100, in accordance with some embodiments.

Figure 44:
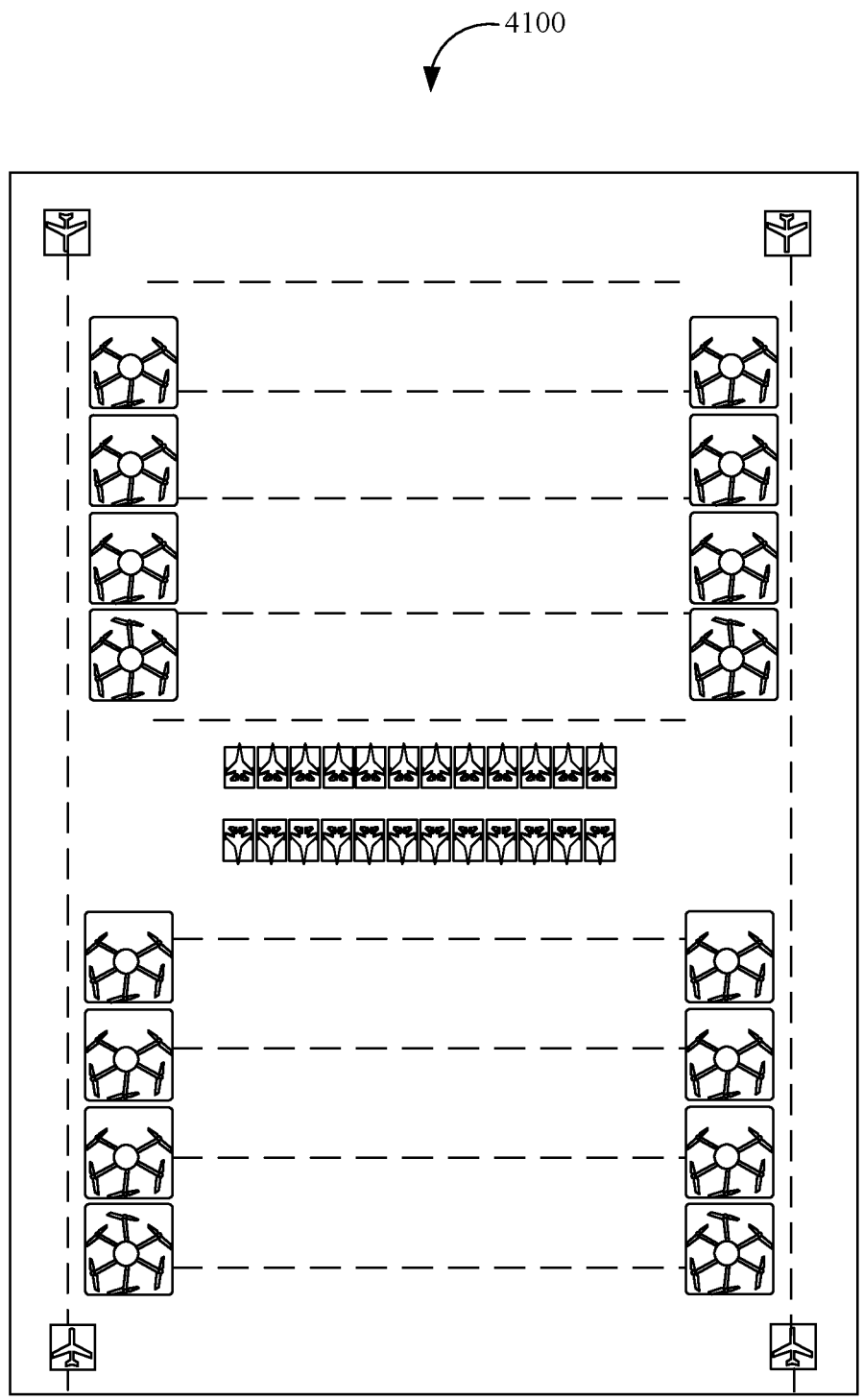
FIG. 44 is a top view of the broad-based ship, in accordance with some embodiments.

FIG. 44 is a top view of the broad-based ship 4100, in accordance with some embodiments.

Figure 45:
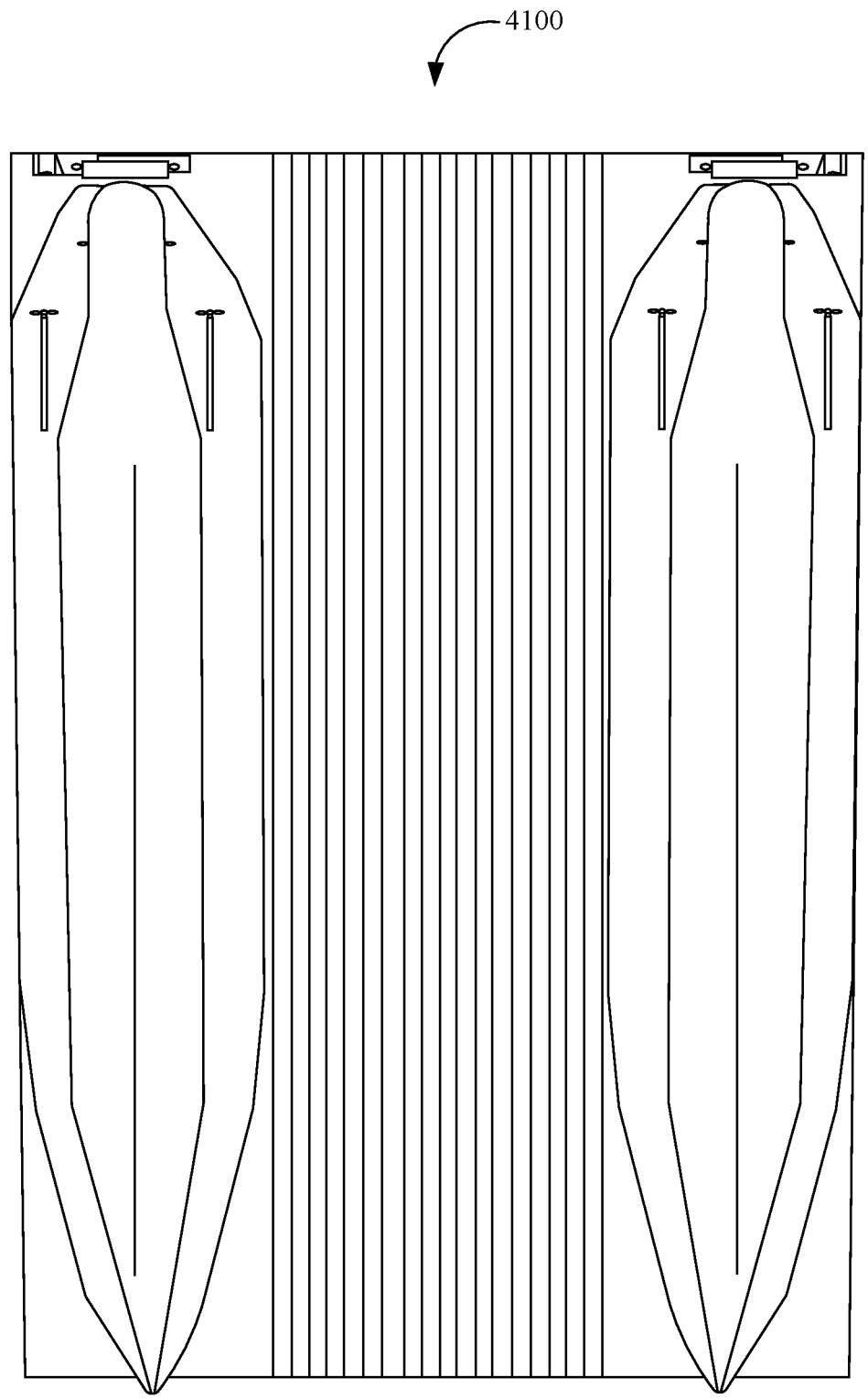
FIG. 45 is a bottom view of the broad-based ship, in accordance with some embodiments.

FIG. 45 is a bottom view of the broad-based ship 4100, in accordance with some embodiments.

Although the present disclosure has been explained in relation to its preferred embodiment, it is to be understood that many other possible modifications and variations can be made without departing from the spirit and scope of the disclosure.

What is claimed is:

1. A broad-based ship comprising:
   one or more hulls configured to be floatably disposable in at least one water body;
   a plurality of decks supported on the one or more hulls, wherein the one or more hulls are attached to a bottom surface of a deck of the plurality of decks, wherein the plurality of decks are vertically spaced forming at least one interior space between the plurality of decks, wherein the plurality of decks comprises a flight deck and at least one lower deck, wherein the at least one lower deck is vertically disposed below the flight deck, wherein the at least one interior space comprises at least one hangar space formed between the flight deck and the at least one lower deck, wherein the at least one hangar space is configured for housing a plurality of aircraft, wherein the housing comprises disposing the plurality of aircraft on the at least one lower deck, wherein the flight deck comprises a plurality of airstrips disposed on an upper flight deck surface of the flight deck, wherein the plurality of airstrips is configured for allowing at least one of landing and taking off of the plurality of aircraft on the plurality of airstrips simultaneously; and
   a plurality of elevators disposed in the at least one hangar space, wherein the plurality of elevators is configured for transporting the plurality of aircraft between the at least one lower deck and the flight deck simultaneously, wherein the transporting comprises transferring the plurality of aircraft from the at least one lower deck to the flight deck simultaneously, wherein the taking off of the plurality of aircraft simultaneously is based on the transferring of the plurality of aircraft from the at least one lower deck to the flight deck, wherein the transporting comprises transferring the plurality of aircraft from the flight deck to the at least one lower deck, wherein the housing of the plurality of aircraft is based on the transferring of the plurality of aircraft from the flight deck to the at least one lower deck.

2. The broad-based ship of claim 1, wherein the one or more hulls is arranged in at least one hull configuration on the bottom surface of the deck for steadily disposing the broad-based ship on the at least one water body, wherein the at least one of the landing and the taking off the plurality of aircraft from the plurality of airstrips simultaneously is further based on the steadily disposing of the broad-based ship.

3. The broad-based ship of claim 2, wherein a hull configuration of the at least one hull configuration of the one or more hulls on the bottom surface of the deck corresponds to a payload capacity of the broad-based ship, wherein the at least one of the landing and the taking off of the plurality of aircraft simultaneously is further based on the payload capacity.

4. The broad-based ship of claim 2, wherein a hull configuration of the at least one hull configuration of the one or more hulls on the bottom surface of the deck corresponds to a submerged volume of the one or more hulls in the water of the at least one water body, wherein a propelling speed of the broad-based ship is based on the submerged volume of the one or more hulls.

5. The broad-based ship of claim 1, wherein the one or more hulls comprises a first hull and a second hull, wherein the first hull is attached to a first peripheral side of the bottom surface of the deck, wherein the second hull is attached to a second peripheral side of the bottom surface of the deck, wherein the first peripheral side of the bottom surface opposes the second peripheral side of the bottom surface.

6. The broad-based ship of claim 1, wherein the flight deck comprises a flight deck length and a flight deck breadth defining the upper flight deck surface, wherein the at least one of the landing and the taking off of the plurality of aircraft is further based on the flight deck length and the flight deck breadth.

7. The broad-based ship of claim 6, wherein the flight deck length is at least 10580 feet and the flight deck breadth is at least 5288 feet.

8. The broad-based ship of claim 6, wherein at least one of the landing of the plurality of aircraft on the plurality of airstrips does not require a plurality of landing cables and the taking of the plurality of aircraft from the plurality of airstrips does not require a plurality of pulley assemblies based on the flight deck length and flight deck breadth.

9. The broad-based ship of claim 1, wherein the plurality of airstrips comprises at least 24 airstrips, wherein the at least 24 airstrips allows the at least one of the landing and the taking off of at least 24 aircraft from the at least 24 airstrips simultaneously.

10. The broad-based ship of claim 1, wherein the transporting of the plurality of aircraft between the at least one lower deck and the flight deck is independently and simultaneously.

11. The broad-based ship of claim 1, wherein the transporting of the plurality of aircraft between the at least one lower deck and the flight deck is dependently and simultaneously.

12. A broad-based ship comprising:
    one or more hulls configured to be floatably disposable in at least one water body;

a plurality of decks supported on the one or more hulls, wherein the one or more hulls are attached to a bottom surface of a deck of the plurality of decks, wherein the plurality of decks are vertically spaced forming at least one interior space between the plurality of decks, wherein the plurality of decks comprises a flight deck and at least one lower deck, wherein the at least one lower deck is vertically disposed below the flight deck, wherein the at least one interior space comprises at least one hangar space formed between the flight deck and the at least one lower deck, wherein the at least one hangar space is configured for housing a plurality of aircraft, wherein the housing comprises disposing the plurality of aircraft on the at least one lower deck, wherein the flight deck comprises a plurality of airstrips disposed on an upper flight deck surface of the flight deck, wherein the plurality of airstrips is configured for allowing at least one of landing and taking off of the plurality of aircraft on the plurality of airstrips simultaneously, wherein the plurality of airstrips comprises at least 24 airstrips, wherein the at least 24 airstrips allows the at least one of the landing and the taking off of at least 24 aircraft from the at least 24 airstrips simultaneously; and a plurality of elevators disposed in the at least one hangar space, wherein the plurality of elevators is configured for transporting the plurality of aircraft between the at least one lower deck and the flight deck simultaneously, wherein the transporting comprises transferring the plurality of aircraft from the at least one lower deck to the flight deck simultaneously, wherein the taking off of the plurality of aircraft simultaneously is based on the transferring of the plurality of aircraft from the at least one lower deck to the flight deck, wherein the transporting comprises transferring the plurality of aircraft from the flight deck to the at least one lower deck, wherein the housing of the plurality of aircraft is based on the transferring of the plurality of aircraft from the flight deck to the at least one lower deck.

13. The broad-based ship of claim 12, wherein the one or more hulls is arranged in at least one hull configuration on the bottom surface of the deck for steadily disposing the broad-based ship on the at least one water body, wherein the at least one of the landing and the taking off the plurality of aircraft from the plurality of airstrips simultaneously is further based on the steadily disposing of the broad-based ship.

14. The broad-based ship of claim 13, wherein a hull configuration of the at least one hull configuration of the one or more hulls on the bottom surface of the deck corresponds to a payload capacity of the broad-based ship, wherein the at least one of the landing and the taking off of the plurality of aircraft simultaneously is further based on the payload capacity.

15. The broad-based ship of claim 13, wherein a hull configuration of the at least one hull configuration of the one or more hulls on the bottom surface of the deck corresponds to a submerged volume of the one or more hulls in the water of the at least one water body, wherein a propelling speed of the broad-based ship is based on the submerged volume of the one or more hulls.

16. The broad-based ship of claim 12, wherein the one or more hulls comprises a first hull and a second hull, wherein the first hull is attached to a first peripheral side of the bottom surface of the deck, wherein the second hull is attached to a second peripheral side of the bottom surface of the deck, wherein the first peripheral side of the bottom surface opposes the second peripheral side of the bottom surface.

17. The broad-based ship of claim 12, wherein the flight deck comprises a flight deck length and a flight deck breadth defining the upper flight deck surface, wherein the at least one of the landing and the taking off of the plurality of aircraft is further based on the flight deck length and the flight deck breadth.

18. The broad-based ship of claim 17, wherein the flight deck length is at least 10580 feet and the flight deck breadth is at least 5288 feet.

19. The broad-based ship of claim 17, wherein at least one of the landing of the plurality of aircraft on the plurality of airstrips does not require a plurality of landing cables and the taking of the plurality of aircraft from the plurality of airstrips does not require a plurality of pulley assemblies based on the flight deck length and flight deck breadth.

20. The broad-based ship of claim 12, wherein the transporting of the plurality of aircraft between the at least one lower deck and the flight deck is independently and simultaneously.

* * * * *